(12) United States Patent
Hisamatsu et al.

(10) Patent No.: US 7,467,097 B2
(45) Date of Patent: Dec. 16, 2008

(54) BUSINESS MANAGEMENT METHOD, BUSINESS MANAGEMENT APPARATUS AND DATA BROADCAST DELIVERY METHOD

(75) Inventors: Ryuichiro Hisamatsu, Kanagawa (JP); Takamichi Mitsuhashi, Tokyo (JP); Tadashi Saito, Chiba (JP); Katsutoshi Sakao, Kanagawa (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 09/829,573

(22) Filed: Apr. 10, 2001

(65) Prior Publication Data

US 2002/0007328 A1    Jan. 17, 2002

(30) Foreign Application Priority Data

Apr. 11, 2000   (JP)   ............................. 2000-109965
Nov. 10, 2000   (JP)   ............................. 2000-343599

(51) Int. Cl.
G06F 17/60   (2006.01)
(52) U.S. Cl. ............................. 705/26; 705/32; 705/27
(58) Field of Classification Search ................ 705/34, 705/40, 27, 26, 14, 32; 725/115, 131, 134; 348/473
See application file for complete search history.

(56) References Cited

U.S. PATENT DOCUMENTS

| | | | |
|---|---|---|---|
| 4,422,093 A * | 12/1983 | Pargee, Jr. ................... | 358/12 |
| 5,671,195 A | 9/1997 | Lee | |
| 5,724,424 A | 3/1998 | Gifford | |
| 5,959,945 A * | 9/1999 | Kleiman ....................... | 381/81 |
| 6,226,618 B1 * | 5/2001 | Downs et al. .................. | 705/1 |
| 6,591,247 B2 * | 7/2003 | Stern ........................... | 705/14 |
| 6,611,842 B1 * | 8/2003 | Brown ......................... | 707/102 |
| 6,654,547 B1 * | 11/2003 | Maeda et al. ................ | 386/125 |
| 6,839,685 B1 * | 1/2005 | Leistensnider et al. ........ | 705/36 |
| 2003/0172012 A1 * | 9/2003 | Otsuka et al. ................. | 705/32 |

FOREIGN PATENT DOCUMENTS

| | | | |
|---|---|---|---|
| JP | 2006325156 A | * | 11/2006 |
| WO | WO 05 18449 | | 7/1995 |
| WO | WO 98 28869 | | 7/1998 |
| WO | WO 1999/027462 | | 6/1999 |
| WO | WO 1999/049404 | | 9/1999 |
| WO | WO 00 04718 | | 1/2000 |

\* cited by examiner

*Primary Examiner*—Pierre E Elisca
(74) *Attorney, Agent, or Firm*—Frommer Lawrence & Haug LLP; William S. Frommer; Thomas F. Presson

(57) ABSTRACT

A business management method, a business management apparatus and a data broadcast delivery method are disclosed which allows contents to be broadcast over an unused bandwidth in satellite broadcasting so that the contents are stored and later reproduced as needed for quick access to a desired destination recorded in the contents. A data broadcast is assigned to an unused broadcast bandwidth over a broadcast band for transmitting programs in satellite broadcasting. The data broadcast over the unused bandwidth are stored onto a storage medium in a TV set. The stored data contents are sorted out by category for selective viewing by operation of the TV set. If the selected content offers e-commerce, a virtual shop handing desired offerings is accessed as per the content.

19 Claims, 17 Drawing Sheets

BROADCAST BAND TYPICALLY ASSIGNED TO A BROADCAST OPERATOR

TYPICAL BC DIGITAL BROADCAST

BUSINESS MANAGEMENT METHOD, BUSINESS MANAGEMENT APPARATUS AND DATA BROADCAST DELIVERY METHOD

BACKGROUND OF THE INVENTION

The present invention relates to a business management method, a business management apparatus, and a data broadcast delivery method for use in managing a broadcast business that broadcasts data in a manner multiplexed in broadcast programs as in the case of satellite broadcasts.

Satellite broadcasts involve the use of artificial satellites in geostationary orbit at a height of about 36,000 km. Two kinds of satellites are involved: broadcasting satellite (BS) and communication satellite (CS). Transmissions from these satellites are captured by simple receiving equipment.

Any such satellite broadcast using a single wavelength can cover the whole territory of a nation from a single transmitting point of a geostationary orbit. This permits setting up a relatively economical and efficient nationwide broadcast business that is far easier to deploy throughout the country than terrestrial broadcast businesses. Another benefit of the satellite broadcast is its ability to eliminate weak-signal localities. In Japan, typical bandwidths for satellite broadcasts allow for broadband transmission channels, e.g., 27 MHz for a BS analog broadcast, 34.5 MHz for a BS digital broadcast, and 26 MHz for a CS broadcast. That means much larger amounts of information are conveyed over the channels than before, offering the possibility of new broadcast services which have not been available with the existing terrestrial broadcast businesses.

In order to receive satellite broadcasts, TV sets need to be hooked up to a parabolic antenna each.

Meanwhile, as a form of electronic commerce (e-commerce), so-called virtual shopping has already been practiced generally by accessing websites on the Internet.

In above-described satellite broadcast businesses, video contents are typically procured from subcontractors and transmitted via satellite for reception by viewers' TV sets. For viewing in real time, the viewer must switch channels to select desired contents from only what is being broadcast as programs at that point in time.

Video contents may be videotaped or otherwise recorded by presetting for subsequent viewing. Such preset recording, however, has the disadvantage of requiring complicated operations by the viewer.

Personal computers may be used to gain access to programs broadcast over a network. In such cases, however, the pointing device (e.g., a mouse) and related controls are generally difficult to manipulate. Because the speed of data transmission is typically 64 Kbps at most, it takes time to log on to a broadcasting station on a network and get response therefrom. Another problem is the lack of sufficient capacity for storing contents. Typically, only one video program can be recorded over a given period of time. In addition, broadcasts over a network are costly as in the case of the Internet which requires connection and communication fees. For network broadcasts to gain widespread acceptance will thus require substantial progress in technical and institutional terms.

SUMMARY OF THE INVENTION

The present invention has been made in view of the above circumstances and provides a business management method, a business management apparatus, and a data broadcast delivery method for promoting widespread acceptance of content distribution and service-related businesses through the use of existing or future data broadcasts.

In carrying out the invention and according to one aspect thereof, there is provided a business management method comprising the steps of obtaining information about earnings and expenses based on expenses incurred by content providers supplying users with recording devices compatible with contents offered by the providers, on content subscription fees paid by the users for receiving the contents and on earnings derived from services and/or advertisements included in the contents, and controlling fees to be paid for the services and/or the advertisements in accordance with the information about the earnings and expenses thus obtained.

According to another aspect of the invention, there is provided a business management apparatus comprising information processing means for obtaining information about earnings and expenses obtained based on the expenses incurred by content providers supplying users with recording devices compatible with contents offered by the providers, on content subscription fees paid by the users for receiving the contents, and on the earnings derived from services and/or advertisements included in the contents and controlling means for controlling fees to be paid for the services and/or the advertisements in accordance with the information about the earnings and expenses thus obtained.

According to a further aspect of the invention, there is provided a data broadcast delivery method comprising the steps of allocating a data broadcast to any unused bandwidth over a broadcast band used by a broadcasting station to broadcast programs, causing a receiving side to receive the data broadcast for storage onto a storage medium in each of television sets installed, sorting out contents included in the stored data broadcast, and allowing viewers to operate the television sets for selective viewing of the sorted-out contents.

With the inventive business management method in use, information about earnings and expenses is first obtained based on expenses incurred by content providers supplying users with recording devices compatible with contents offered by the providers, on content subscription fees paid by the users for receiving the offered contents, and on earnings derived from services and/or advertisements included in the contents. The fees to be paid for such services and/or advertisements are controlled by the content providers in accordance with the information about the earnings and expenses thus obtained using the method.

The inventive method allows the content providers suitably to manage the fees to be paid for the services and/or the advertisements included in the contents in redistribution of profits to the providers. Profits are also passed on to the manufacturers of the recording devices. The users are also allowed to take part in the earnings in the form of reduced content subscription fees. These benefits combine to promote widespread acceptance of content distribution and service-related businesses involving the use of data broadcasts.

With the business management apparatus according to the invention, information about earnings and expenses is also obtained based on expenses incurred by content providers supplying users with recording devices compatible with contents offered by the providers, on content subscription fees paid by the users for receiving the offered contents, and on earnings derived from services and/or advertisements included in the contents. The fees to be paid for such services and/or advertisements are controlled by the content providers in accordance with the information about the earnings and expenses thus obtained using the apparatus.

The inventive apparatus allows the content providers suitably to manage the fees to be paid for the services and/or the advertisements included in the contents in redistribution of profits to the providers. Profits are also passed on to the manufacturers of the recording devices. The users are also allowed to take part in the earnings in the form of reduced content subscription fees. These benefits combine to promote widespread acceptance of content distribution and service-related businesses involving the use of data broadcasts.

According to the inventive data broadcast delivery method, a data broadcast is allocated to any unused bandwidth over a broadcast band used by a given broadcasting station to broadcast programs. The receiving side receives the data broadcast for storage onto a storage medium in each of television sets installed. Any unused narrow bandwidth made available from the band for broadcasting programs may be utilized in transmitting various contents. This makes it possible to make effective use of the broadcast band.

The contents included in the stored data broadcast are sorted out. Each viewer then operates the television set selectively to view the contents sorted out. These features permit easy selection of a desired content from the menu of diverse contents, constituting an easy-to-use system of content distribution by data broadcast.

The above and other objects, features and advantages of the present invention will become apparent from the following description and the appended claims, taken in conjunction with the accompanying drawings in which like parts or elements denoted by like reference symbols.

DETAILED DESCRIPTION OF THE INVENTION

Preferred embodiments of this invention will now be described in detail with reference to the accompanying drawings. Described first is a business management system for managing a satellite broadcast business in accordance with a business management method and a business management apparatus according to the invention.

Figure 1:
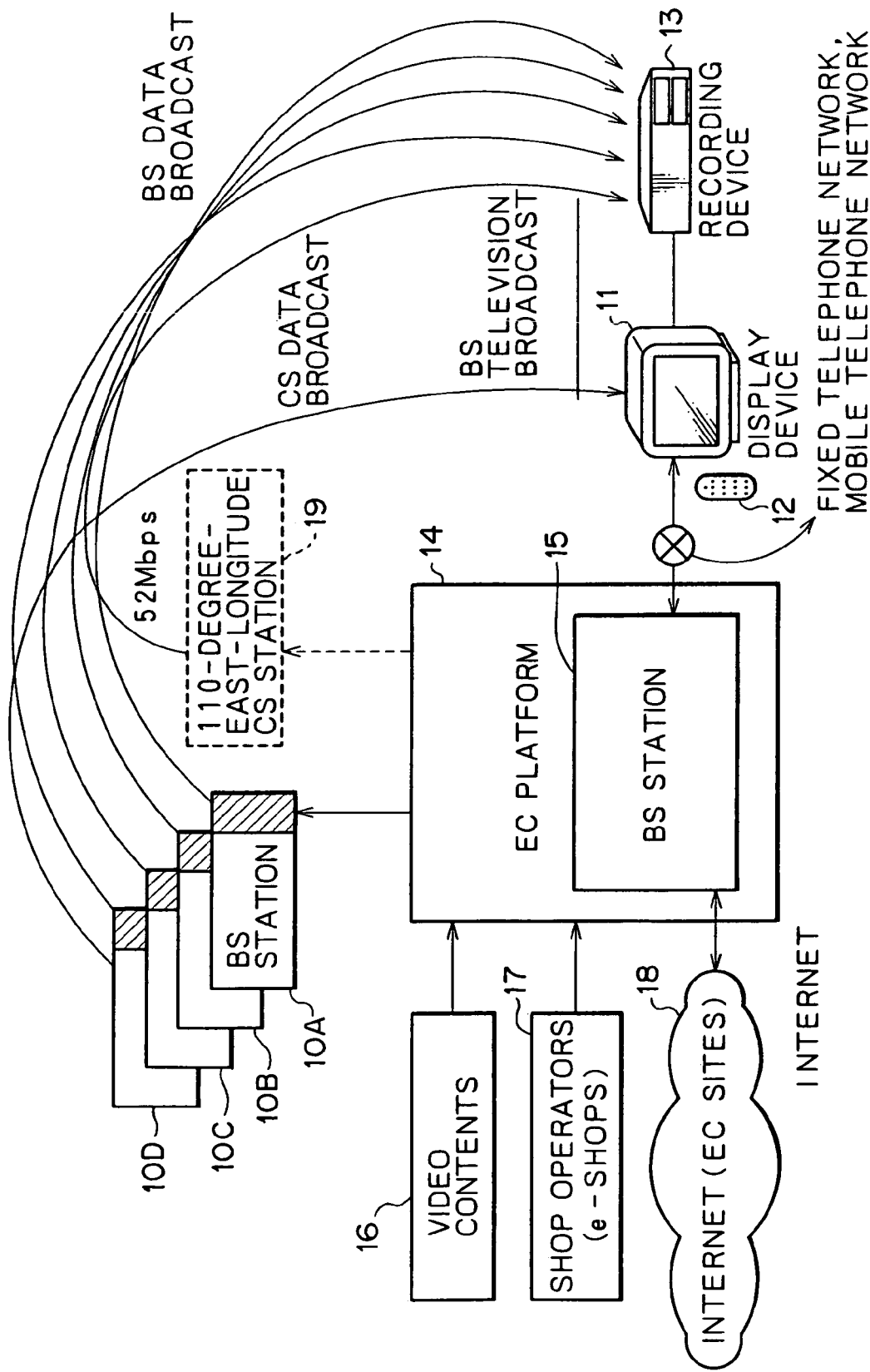
FIG. 1 is a schematic view of a BS station constituting a satellite broadcast system according to the present invention.

FIG. 1 is a schematic view of a satellite broadcast business management system embodying the invention.

This business management system comprises BS stations 10A through 10D as satellite broadcast operators distributing video contents via satellite in a BS broadcast setup, and TV sets 11 capable of receiving and displaying the video contents distributed by the BS stations. In FIG. 1, a shaded portion in each block of the BS stations 10A through 10D represents a data broadcast facility.

Each TV set 11 is connected to a storage medium for recording BS data broadcasts, such as a hard disk drive 13 with a storage capacity of 36 GB used in this embodiment. If a broadcast involves a transmission rate of 4 Mbps (SD), the 36-GB hard disk drive 13 may record broadcast data for up to 20 hours.

Figure 2:
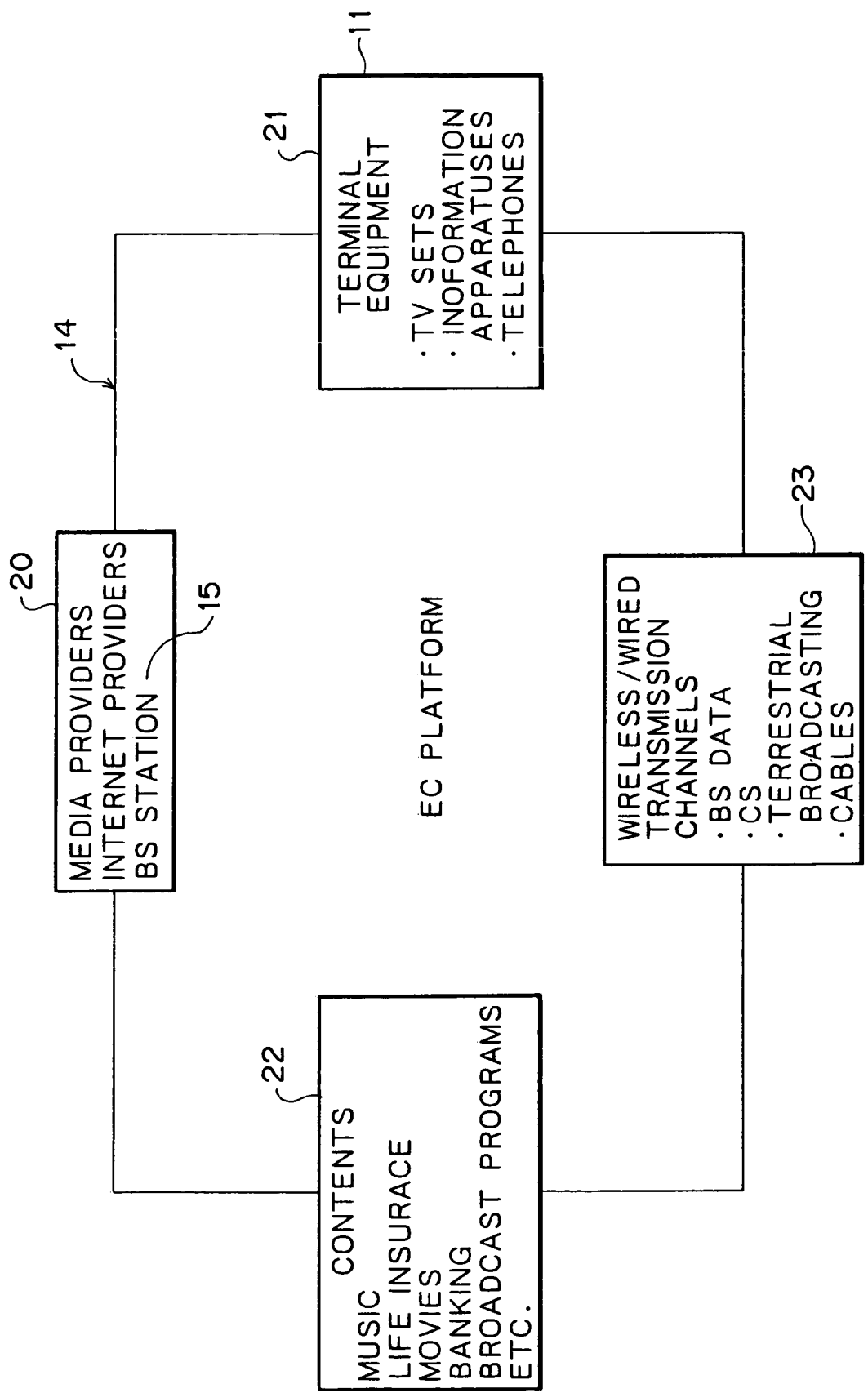
FIG. 2 is a schematic conceptual view of an EC platform that includes the BS station of FIG. 1, wireless/wired transmission channels, providers and terminal equipment, all interconnected in a suitably organized manner.

This system further includes an EC platform 14 that provides the BS stations with procured video contents and information about companies or operators setting up virtual shops (e-shops). As shown in FIG. 2, the EC platform 14 has media providers 20, terminal equipment 21, contents 22, and wireless/wired transmission channels 23 connected in a suitably organized manner. The media providers 20 include Internet providers and a BS station, etc. The terminal equipment 21 comprises information-related devices such as the TV set 11 and a personal computer, a mobile phone, and a wired telephone. The contents 22 include an extensive range of offerings: music, life insurance information, movies, banking information, broadcast program schedules, etc. The wireless/wired transmission channels 23 cover all channels involved: BS data channels, CS channels, and cables.

This system is designed to accommodate as needed a 110-degree-east-longitude CS station 19 to be launched in the future. The 110-degree-east-longitude CS station 19 will illustratively provide CS data broadcasts at 52 Mbps.

Figure 3:
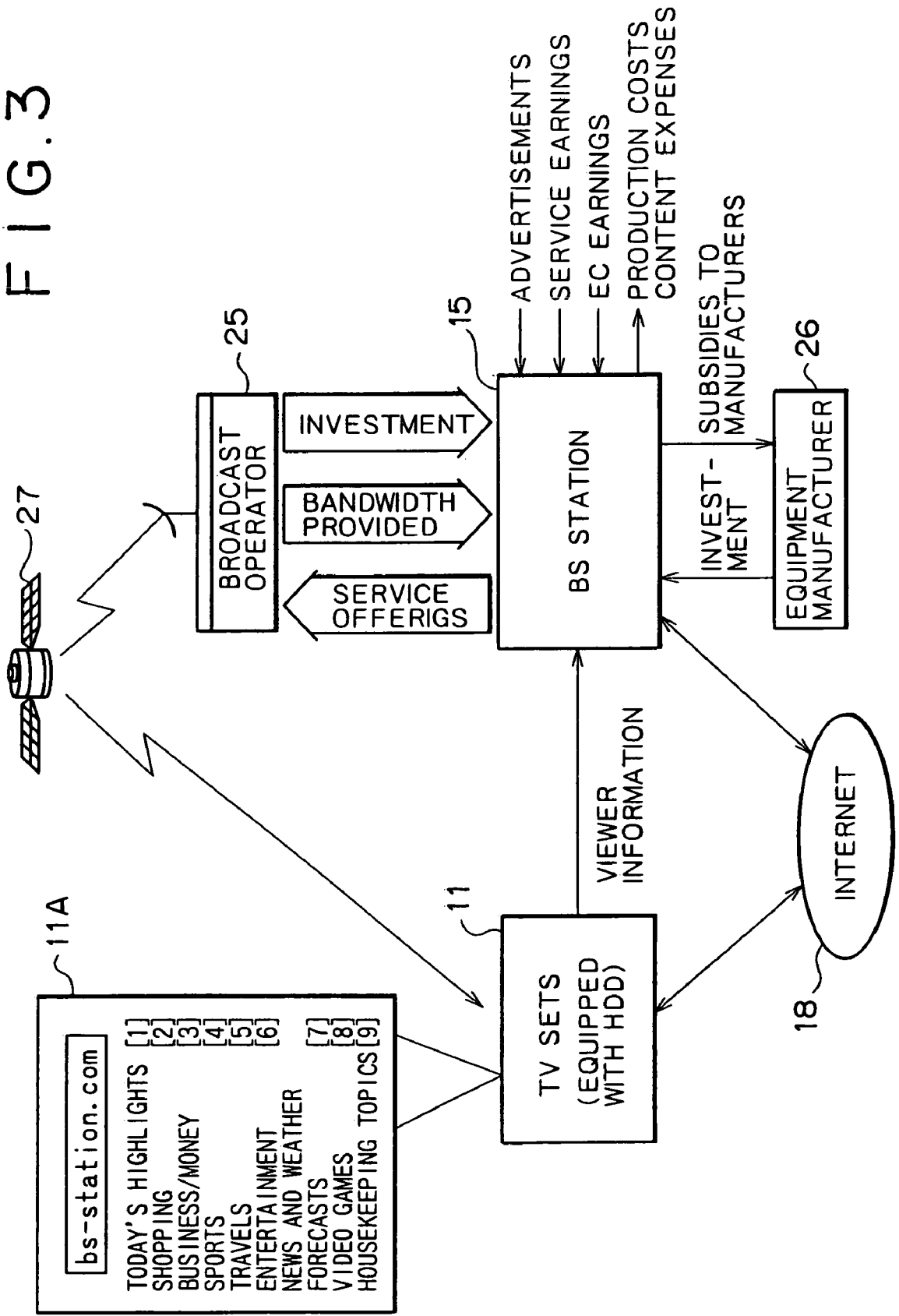
FIG. 3 is an explanatory view sketching functions and a business structure of the BS station shown in FIG. 1.

The BS station 15 has such functions as organization and delivery of storage type broadcasts, customer authentication, settlement of fees, distribution and management of hard disk drives, customer support, and a network gateway facility. As shown in FIG. 3, a business setup of the BS station 15 is constituted by a broadcast operator 25 and equipment manufacturers 26 making joint capital investment. With this embodiment, a broadcast band of 2 Mbps or thereabout is established between the BS station 15 and the broadcast operator 25. Services such as video contents and e-commerce information are conveyed over the band.

The equipment manufacturers 26 supply each consumer with a storage medium (a hard disk drive in the case of this embodiment) free of charge or for a fee below cost. The storage medium is used to store BS data supplied to the consumer. For compensation, the manufacturers 26 receive a subsidy from the BS station 15.

On the viewer's side, the TV set 11 is installed which has a dedicated storage medium (hard disk drive) incorporated or independently connected to the set. The storage medium is capable of receiving and temporarily storing BS data broadcasts on a first-in, first-out (FIFO) basis. That is, BS data broadcasts are recorded to the storage medium in such a manner that when the medium is exhausted, the initially recorded data are deleted to make room for the most recently received data. The viewer may select and enjoy desired contents from the temporarily stored BS data broadcasts.

Illustratively, as depicted in FIG. 3, the viewer may select a menu screen 11A at "bs-station.com" by operating a remote controller (not shown), and choose one of such offerings as "today's highlights," "shopping," "business/money," "sports," "travels," "entertainment," "news and weather forecasts," "video games" and "housekeeping topics." The selected BS data currently stored on the storage medium are then accessed, reproduced and viewed. If "shopping" is selected, the viewer may proceed to see pictures of the offered merchandise and make purchases. The shopping procedure will be described later in more detail.

Figure 4:
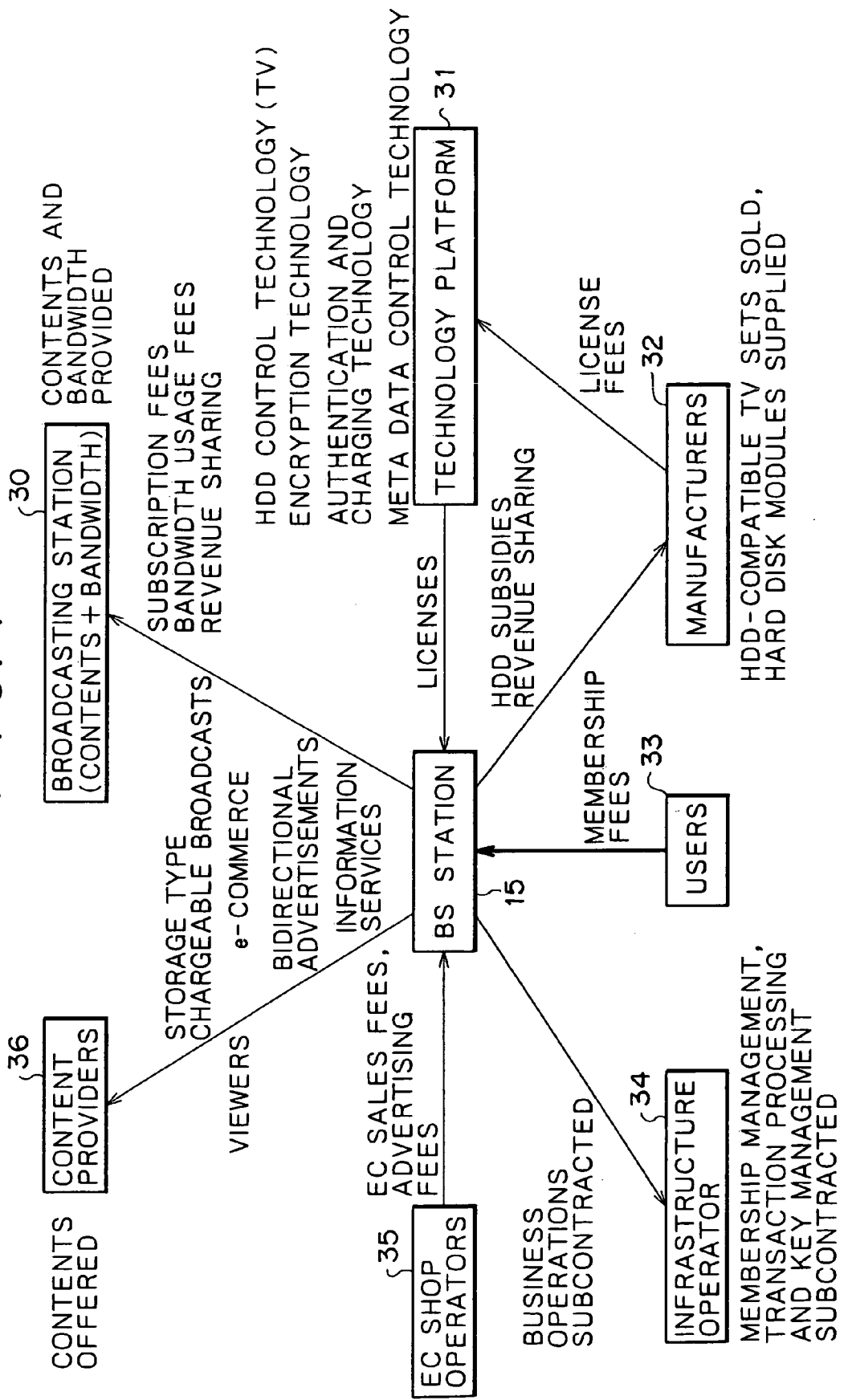
FIG. 4 is a schematic conceptual view of a business model applicable to the BS station of FIG. 1.

As shown in FIG. 4, a business model of the BS station having the above-described functions and business setup is made up of a technology platform 31 intended to resolve technical problems, manufacturers 32 producing TV sets compatible with the hard disk drive, users 33 subscribing to pay membership, an infrastructure operator 34 managing the subscribing members, EC shop operators 35 that are key players of e-commerce, content providers 36 offering diverse contents, and a broadcasting station 30 broadcasting the contents over the bandwidth of around 2 Mbps.

The technology platform 31 supplies the manufacturers 32 with techniques to control the hard disk drive which is connected to each TV set and which stores BS data; with techniques of encryption; with authentication and fee settlement; and with techniques to control meta data. Licenses for the supplied technology are granted to the BS station 15 in return for license fees from the manufacturers 32.

The techniques to control meta data involve storing onto the hard disk drive data broadcasts passed over an unused bandwidth on the broadcast band of a broadcasting station in such a manner that the data are organized into consistent data groups during storage preparatory to reproduction. The techniques may be applied to diverse purposes. For example, a preferred data broadcast may be excerpted and stored for enjoyment by each user, or the information that is most often selected by viewers may be stored preferentially.

It is also possible to control successive storage of the received data broadcast onto the storage medium in such a manner that when a storage capacity of the storage medium either drops below a predetermined level or is completely exhausted, the initially recorded broadcast data are deleted from the storage medium to make room for the most recently received broadcast data.

The manufacturers 32 supply each user with a hard disk drive-compatible TV set and a hard disk module. In return for paying license fees to the technology platform 31, the manufacturers 32 receive a hard disk drive (HDD) subsidy and a share of revenues from the BS station 15.

The user 33 pays membership fees in return for receiving contents, i.e., BS data from the broadcasting station in this embodiment. The infrastructure operator 34 subcontracts business operations from the BS station 15, taking over such tasks as membership management, transaction processing, and key management.

The EC shop operators 35 acquire a virtual shopping environment by paying EC sales fees and advertising fees to the BS station 15.

The content providers 36 provide diverse contents such as video and music offerings of all genres. In compensation, the content providers 36 receive subscription fees from the BS station 15.

The broadcasting station 30 finds an unused bandwidth of, say, 2 Mbps over a broadcast band of 24 Mbps allocated illustratively for BS digital broadcasting, and uses that bandwidth to broadcast data. The bandwidth for data broadcasts varies from one broadcast program to another.

The broadcasting station 30 receives a share of revenues in addition to subscription fees and bandwidth usage fees from the BS station 15.

In the BS station business model of the above-described constitution, actual products, services and money are forwarded as described below with reference to FIGS. 5 and 6.

Figure 5:
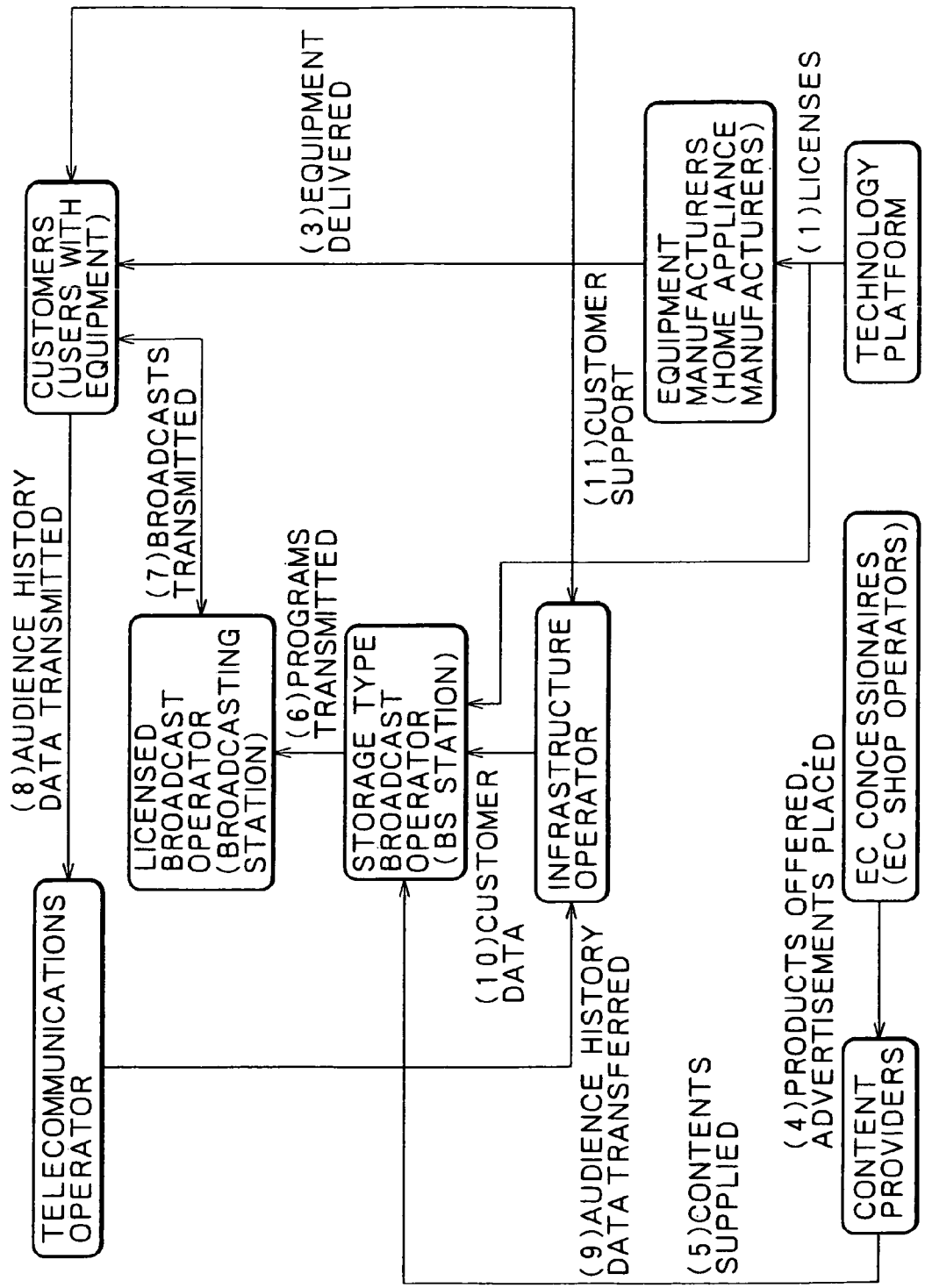
FIG. 5 is a block diagram showing flows of products and services involving the BS station of FIG. 1.

As shown in FIG. 5, the products and services are handled in the following sequence:

(1) The technology platform signs a license agreement with the equipment manufacturers.

(2) The technology platform also signs a license agreement with the storage type broadcast operator that constitutes the BS station.

(3) The equipment manufacturers supply equipment to each customer having subscribed to data broadcasts. The equipment is a TV set containing a hard disk drive (HDD) or a TV set connected to the HDD. The equipment includes a storage medium on which to store data broadcasts and software programs for reproducing the stored broadcast data in suitably controlled fashion. Each customer receives the equipment free of charge or for an appreciably small fee. Any revenue stemming from the equipment itself is reduced to a minimum because most of the earnings are expected to come from content subscription fees for using the stored broadcast data and from sales materialized in virtual shopping.

(4) The EC shop operators offering virtual shopping supply the content providers with products and advertisements.

(5) The content providers feed their contents to the storage type broadcast operator.

(6) Upon receipt of video contents and e-commerce contents from the content providers, the storage type broadcast operator forwards data broadcast programs including these contents to a licensed broadcast operator (satellite or terrestrial broadcasting station).

(7) When receiving the data broadcasts from the storage type broadcast operator, the licensed broadcast operator broadcasts the data over an unused bandwidth of current programs (e.g., WOWOW, NHK1 and NHK2 in Japan) on the broadcast band of 24 Mbps.

(8) The customer's equipment restores each of the received data broadcasts into a consistent content for storage. The customer can manipulate menu offerings to view any desired content. Audience history data about the contents viewed by the customers are sent to a telecommunications operator.

(9) Upon receipt of the audience history data, the telecommunications operator forwards the data to the infrastructure operator in such a manner that the data may be scrutinized for the data broadcasts viewed currently and in the past by each customer.

(10) When receiving the audience history data from the telecommunications operator, the infrastructure operator creates customer data by extracting from the received data those items about the contents preferred by customers, genres of the preferred contents, and other relevant data. Given the customer data thus furnished, the storage type broadcast operator reorganizes the current broadcast programs by screening the received data for high ratings and popular offerings in e-commerce. The data broadcasts thus reorganized are sent to the licensed broadcast operator. In this manner, only those data broadcasts satisfying the customers' needs are provided.

How money flows in keeping with the products and services forwarded as explained above will now be a described with reference to FIG. 6.

(1) Customers register with the storage type broadcast operator as members subscribing to data broadcasts and a virtual shopping service with e-commerce offerings included in the broadcasts. The membership registration brings monthly membership fees and additional service fees (e.g., for extra-time viewing) to the storage type broadcast operator.

(2) The equipment manufacturers supply the registered customers with equipment compatible with data broadcasts, i.e., a TV set having a storage medium for storing the data broadcasts, or an apparatus made solely of storage medium connectable to a data broadcast-compatible TV set. The storage type broadcast operator pays the equipment manufacturers a hard disk drive (HDD) subsidy and a share of EC revenues.

(3) The storage type broadcast operator pays content fees to content providers for video contents as well as for contents created to permit e-commerce.

(4) The storage type broadcast operator pays bandwidth usage fees to the licensed broadcast operator for diffusing the data broadcasts.

(5) The storage type broadcast operator pays operational fees and passes a share of EC revenues on to the infrastructure operator.

(6) The infrastructure operator pays line fees to the telecommunications operator.

(7) The storage type broadcast operator pays license fees to the technology platform.

(8) The equipment manufacturers pay license fees to the technology platform.

(9) The EC concessionaires pay concession fees and advertising fees to the content providers.

(10) The EC concessionaires pay EC sales fees, concession fees and advertising fees to the storage type broadcast operator.

Figure 6:
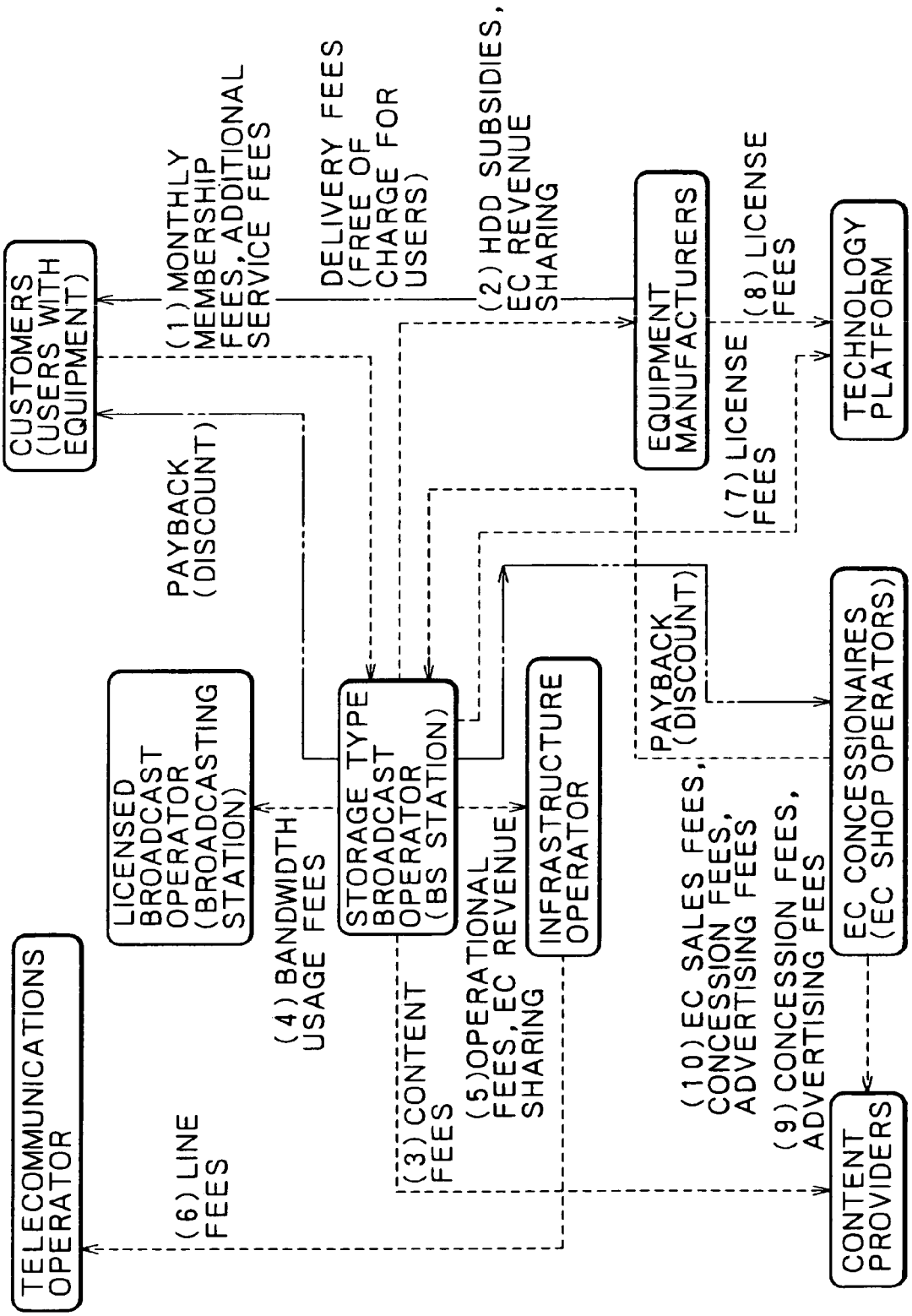
FIG. 6 is a block diagram depicting flows of money involving the BS station of FIG. 1.

Described below with reference to FIGS. 5 and 6 is how to implement a business management method allowing the storage type broadcast operator to count profits by managing the above-described flow of money in order to pass predetermined shares of the profits on to related business operators and users.

For money flow management, the storage type broadcast operator utilizes a business management apparatus comprising: inputting means for receiving information about earnings and expenses for any subsequent redistribution of such earnings as, the information being obtained based on the expenses incurred by content providers supplying users with recording devices compatible with contents offered by the providers, on content subscription fees paid by the users for receiving the contents, and on the earnings derived from services and/or advertisements included in the contents; and controlling means for paying back a share of any earnings to offset the service and/or advertising fees.

Using the business management apparatus of the above constitution, the storage type broadcast operator computes earnings and expenses based on: expenses incurred by the equipment manufacturers as equipment distributors supplying each user with either a TV set incorporating a hard disk drive (HDD) as a recording device ready to record contents offered by virtual shops to the user, or a TV set having the HDD; monthly membership fees and additional service fees paid by the user equipped-with the above-described equipment, subscribing to the contents offered by the virtual shops; and EC sales fees, concession fees and advertising fees, etc. corresponding to the earnings derived from services and/or advertisements included in the contents. With the earnings and expenses computed, a share of the earnings will be paid back to offset the service and/or advertising fees.

Illustratively, suppose that the storage type broadcast operator pays back a share of the earnings to the recording device manufacturers (i.e., equipment manufacturers) depending on the amount of the earnings. In that case, the storage type broadcast operator may utilize a business management apparatus comprising: managing means for managing the number of recording devices supplied to users in correspondence with contents offered by content providers to the users; and determining means for determining fees to be paid for services and/or advertisements included in the contents in accordance with the number of recording devices. The two means combine to decide on the amount of money as a share of EC revenues to be passed on to the equipment manufacturers.

The business management apparatus as described above permits managing redistribution of business profits between those participating in the enterprise; part of the profits is passed on as a share of EC revenues for the equipment manufacturers, or is paid back to offset the monthly membership fees and additional service fees paid by the users for subscribing to the contents.

The business management system above applies not only to satellite broadcast undertaking but also to digital broadcast businesses allowing data to be multiplexed when broadcast.

Figure 7:
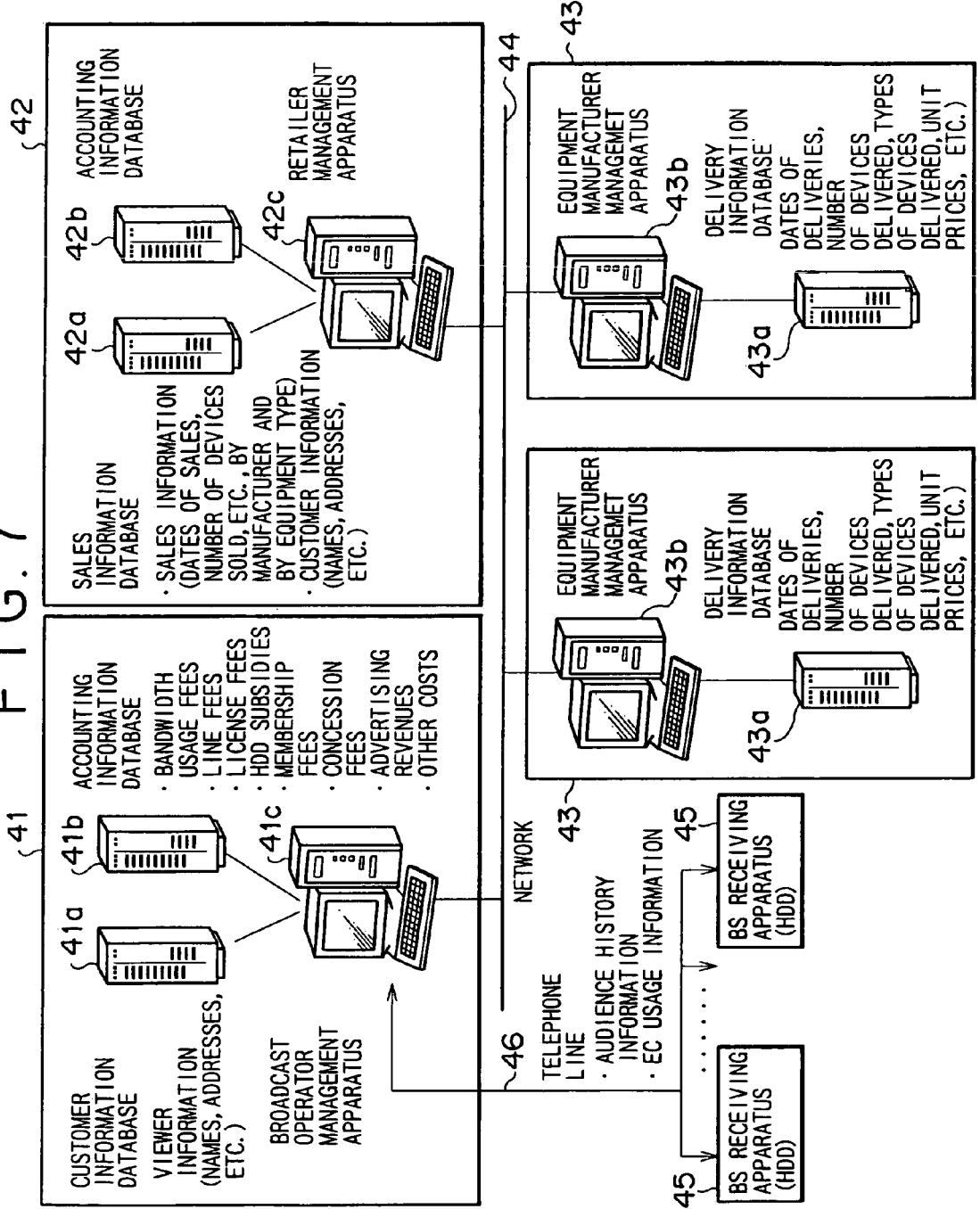
FIG. 7 is a conceptual view illustrating typical structures of business management apparatuses for use with the BS station of FIG. 1.

As shown in FIG. 7, typical business management apparatuses of the invention include a broadcast operator management apparatus 41, a retailer management apparatus 42, and a plurality of equipment manufacturer management apparatuses 43. The management apparatuses 41, 42 and 43 communicate with one another over a network 44 to carry out their respective management processes.

The broadcast operator management apparatus 41 comprises: a customer information database 41a for managing customer information such as names and addresses of viewers; an accounting information database 41b for managing accounting information such as bandwidth usage fees, line fees, license fees, HDD subsidies, membership fees, concession fees, advertising fees, and other expenses; and a server 41c that control these databases.

The server 41c exchanges audience history data and e-commerce usage information with each user's receiving device (i.e., HDD) 45 over telephone lines 46, and collects relevant items of information for storage into suitable databases.

The retailer management apparatus 42 comprises: a sales information database 42a for managing sales information such as sales volumes by manufacturer and by equipment type (dates, number of devices sold, etc.) as well as customer information such as names and addresses of customers; an accounting information database 42b for managing information necessary for accounting processes (such as information about earnings and expenses, to be described later); and a server 42c for controlling these databases.

The equipment manufacturer management apparatuses 43 each include a delivery information database 43a for managing information about deliveries to retailers such as dates of deliveries, number of units delivered, types of equipment delivered, and unit prices; and a server 43b for controlling the database 43a.

Figure 8:
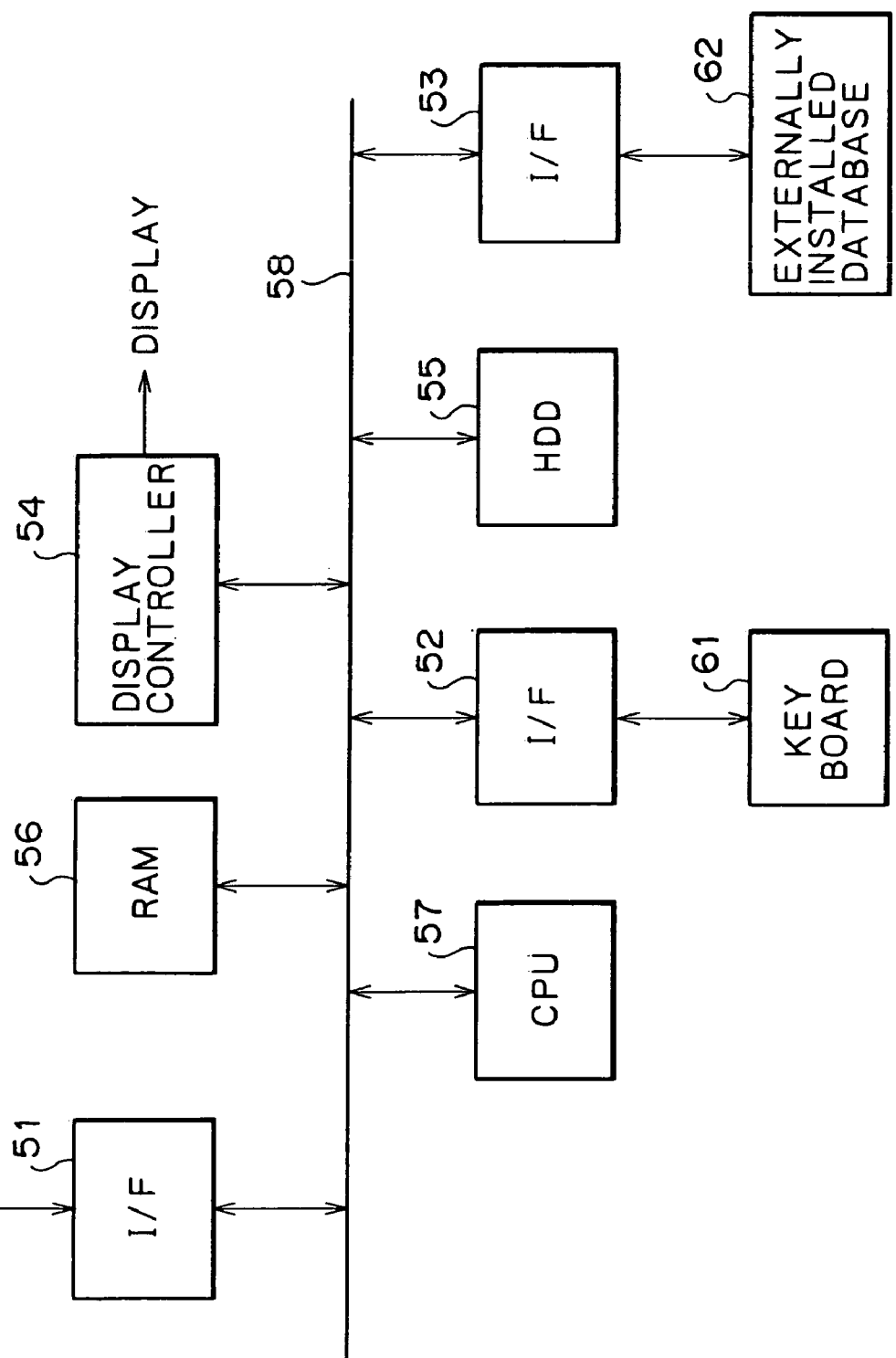
FIG. 8 is a block diagram indicating a basic structure of each of the business management apparatuses shown in FIG. 7.

FIG. 8 is a block diagram showing a basic structure of the management apparatuses 41, 42 and 43. As illustrated, the management apparatuses 41, 42 and 43 each comprise an interface (I/F) 51 adapted to the network 44, an interface 52 to a keyboard 61, an interface 53 to an external database 62, a display controller 54 for controlling a display device, a hard disk drive 55, a RAM 56, and a CPU 57 for controlling the components over a bus 58.

Figure 9:
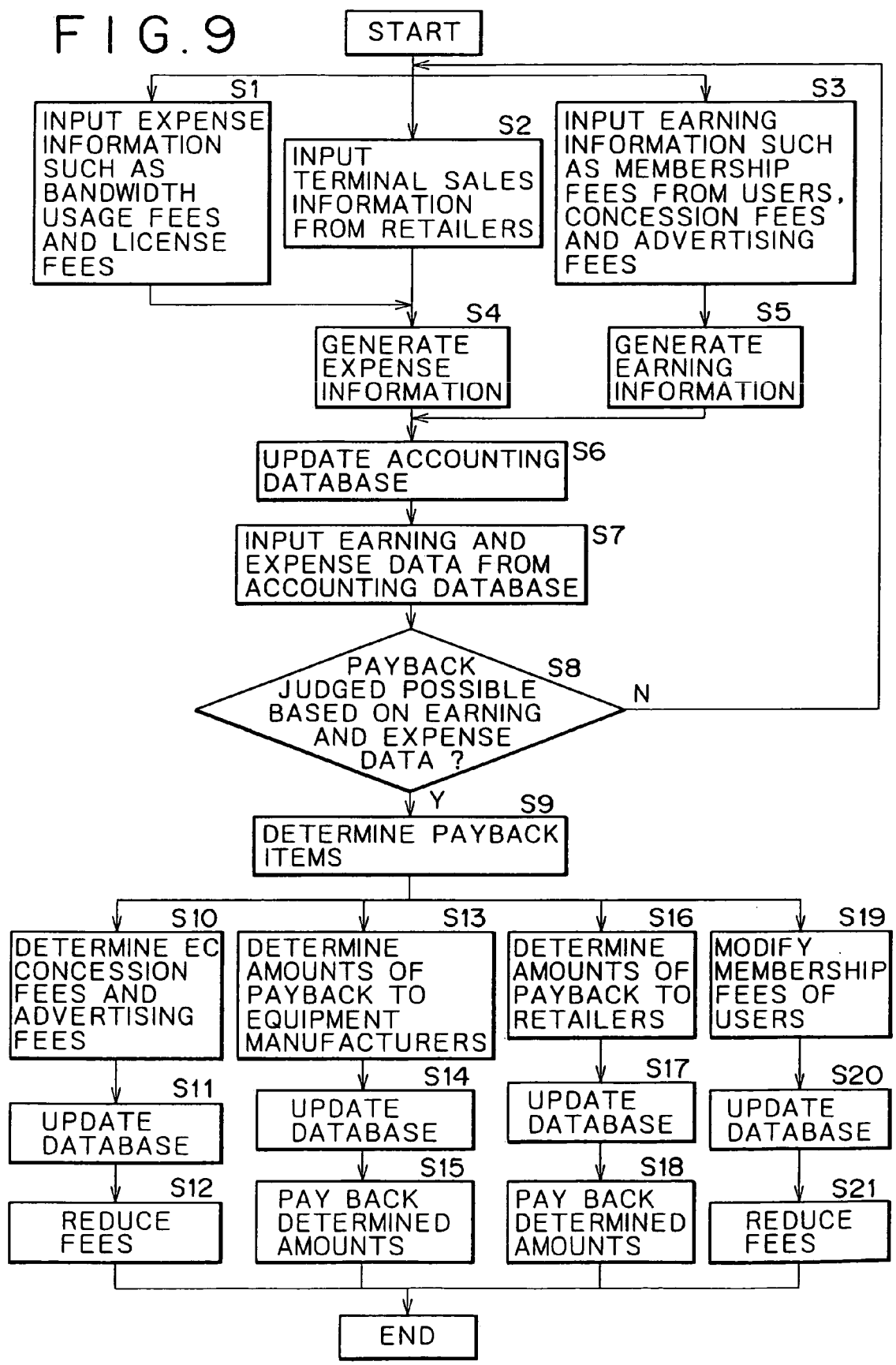
FIG. 9 is a flowchart of steps in which the business management apparatuses of FIG. 7 typically operate.

FIG. 9 is a flowchart of steps as part of processing by the business management apparatuses of the invention. As outlined in the flowchart, the apparatuses acquire information about earnings and expenses based on expenses incurred by content providers supplying users with recording devices (HDD) compatible with contents offered by the providers, on content subscription fees paid by the users for receiving the offered contents, and on earnings derived from services and/or advertisements included in the contents. With the information about the earnings and expenses obtained, the apparatuses pay back part of the earnings to offset the service and/or advertising fees, pass a share of the profits on to the equipment manufacturers, and control the contents offered to the users.

In steps S1 through S3, source information by which to generate expense and earning information is obtained from each of the databases involved.

Illustratively in step S1, expenses are input which includes bandwidth usage fees and line fees paid to the broadcasting station, license fees to the technology platform, and other expenses. In step S2, terminal sales information is input from terminal equipment retailers. These inputs are put together to generate the expense information (in step S4).

In step S3, earnings are input which includes membership fees from users, concession fees, chargeable content subscription fees and advertising revenues from EC shop operators, and other earnings. The inputs are put together to generate the earning information (in step S5).

With the expense information and earning information thus acquired, the information about earnings and expenses in the accounting information database 41b is updated accordingly (in step S6). Such updates are carried out automatically at predetermined intervals in the accounting information database 41b.

The information about earnings and expenses is then input from the accounting information database 41b (in step S7). A check is made on the basis of the input information to see whether a share of the earnings can be paid back (in step S8). If no redistribution of profits is judged possible, control is returned to the beginning of the processing and the information about earnings and expenses is updated continuously.

If it is judged possible to pay back a share of the earnings, then a process to decide on items applicable to payback is initiated (in step S9). The decision is made in line with a predetermined set of rules. The payback items are selected in order of predetermined priorities and by predetermined weighting factors, whereby payback ratios by item are updated as needed.

The concession fees and advertising fees for electronic commerce (EC) are first determined (in step S10); the applicable database is updated (in step S11); and the fees are reduced (in step S12).

The amounts of payback to the equipment manufacturers are then determined (in step S13); the applicable database is updated (in step S14); and the determined amounts are paid back (in step S15).

The amounts of payback to the retailers are determined (in step S16); the applicable database is updated (in step S17); and the determined amounts are paid back (in step S18).

The membership fees paid by users are modified (in step S19); the applicable database is updated (in step S20); and the fees are reduced (in step S21).

How data broadcasts are delivered by embodiments of this invention will now be described by referring illustratively to a digital broadcast transmitting apparatus and a digital broadcast receiving apparatus used in the above-described business management system for BS digital broadcasting.

Figure 10:
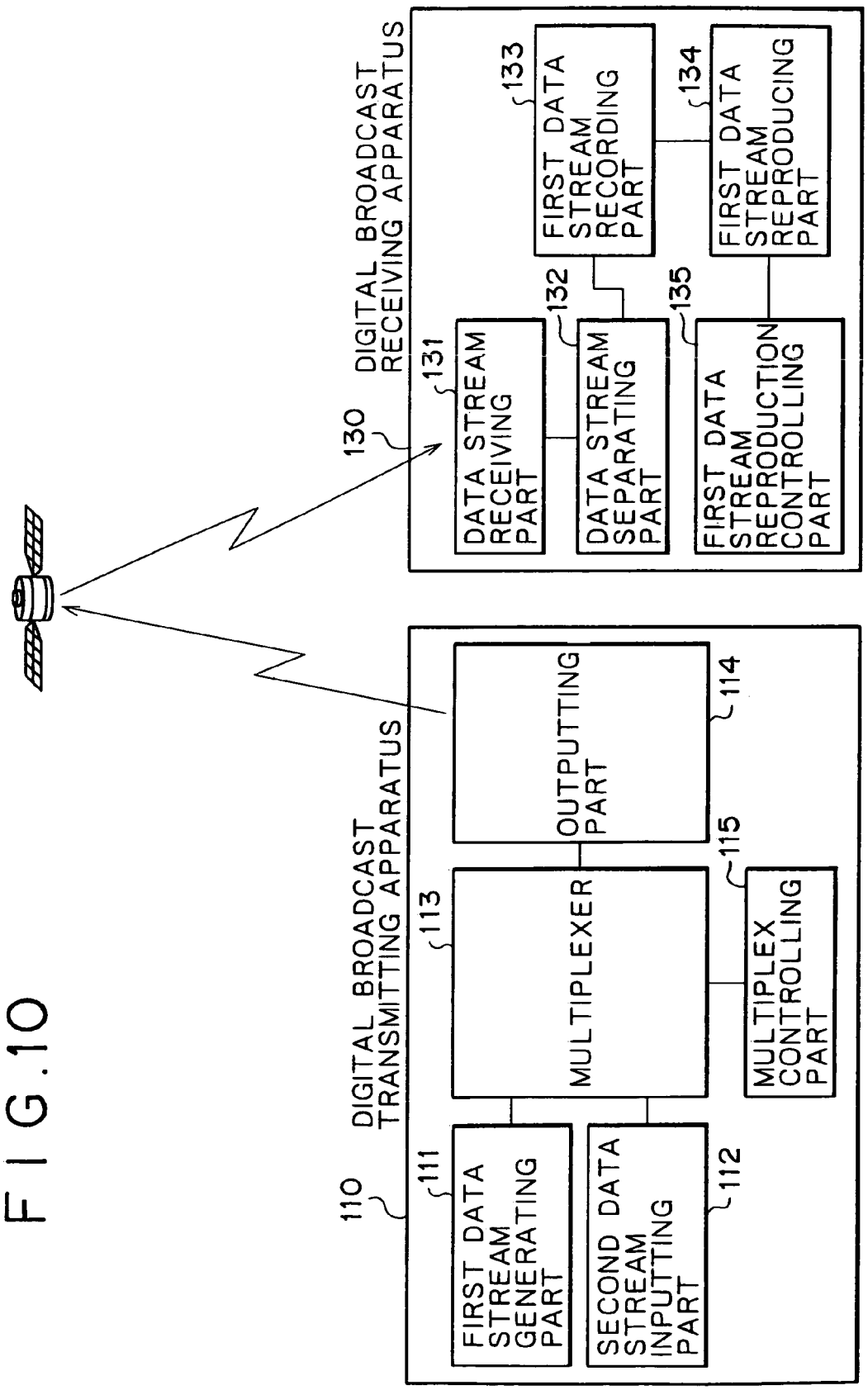
FIG. 10 is a schematic view of a digital broadcast transmitting apparatus and a digital broadcast receiving apparatus according to the present invention.

FIG. 10 is a block diagram of a typical digital broadcast transmitting apparatus and a typical digital broadcast receiving (i.e., recording) apparatus of the present invention.

A digital broadcast transmitting apparatus 110 comprises: a first data stream generating part 111 for generating a first data stream including at least audio and video data; a second data stream inputting part 112 for inputting a second data stream including audio and video data output as broadcast programs; a multiplexer 113 for multiplexing the first and the second data stream; an outputting part 114 for outputting the multiplexed data stream; and a multiplex controlling part 115 for controlling the multiplexing process so that the transmission rate of the first data stream becomes lower than its coding bit rate.

A digital broadcast receiving apparatus 130 comprises a data stream receiving part 131 for receiving data streams having a first and a second data stream multiplexed therein, the first data stream including at least audio and video data generated and transmitted by the digital broadcast transmitting apparatus 110, the second data stream including audio and video data transmitted as broadcast programs, the transmission rate of the first data stream being rendered lower than its coding bit rate. The receiving apparatus 130 further comprises: a data stream separating part 132 for separating the first data stream from the second data stream during reception by the data stream receiving part 131; a first data stream recording part 133 for recording the first data stream thus separated; a first data stream reproducing part 134 for reproducing the first data stream thus recorded; and a first data stream reproduction controlling part 135 for causing the first data stream reproducing part 134 to reproduce the first data stream after the stream has been recorded in its entirety.

Figure 11:
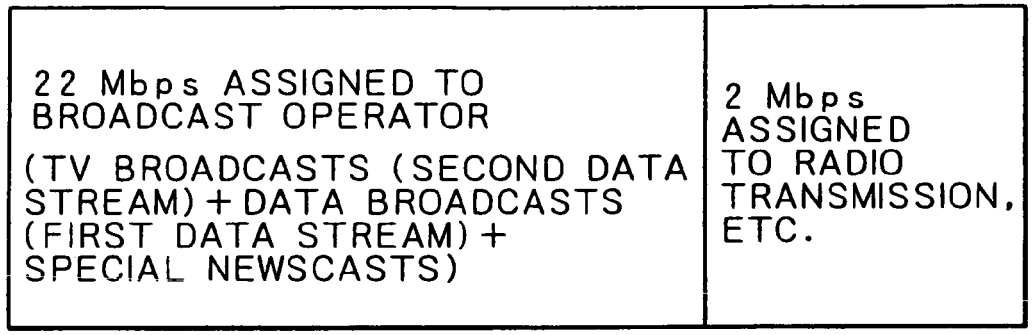
FIG. 11 is a conceptual view of a broadcast band assigned to a broadcast operator utilizing the setup of FIG. 10.

The first data stream generating part 111 handles at least video and audio contents and/or e-commerce contents. As shown in FIG. 11, the transmission rate assigned to the first data stream has a fairly narrow bandwidth of about 2 Mbps compared with a broadcast band of 24 Mbps for a maximum transmission rate of the first and the second data stream.

That is, the broadcast band allocated to one broadcast operator is made up of a total of 24 Mbps broken down into 22 Mbps illustratively for television broadcasts constituting the second data stream as well as for data broadcasts forming the first data stream and special newscasts; and 2 Mbps for radio transmissions.

Figure 12:
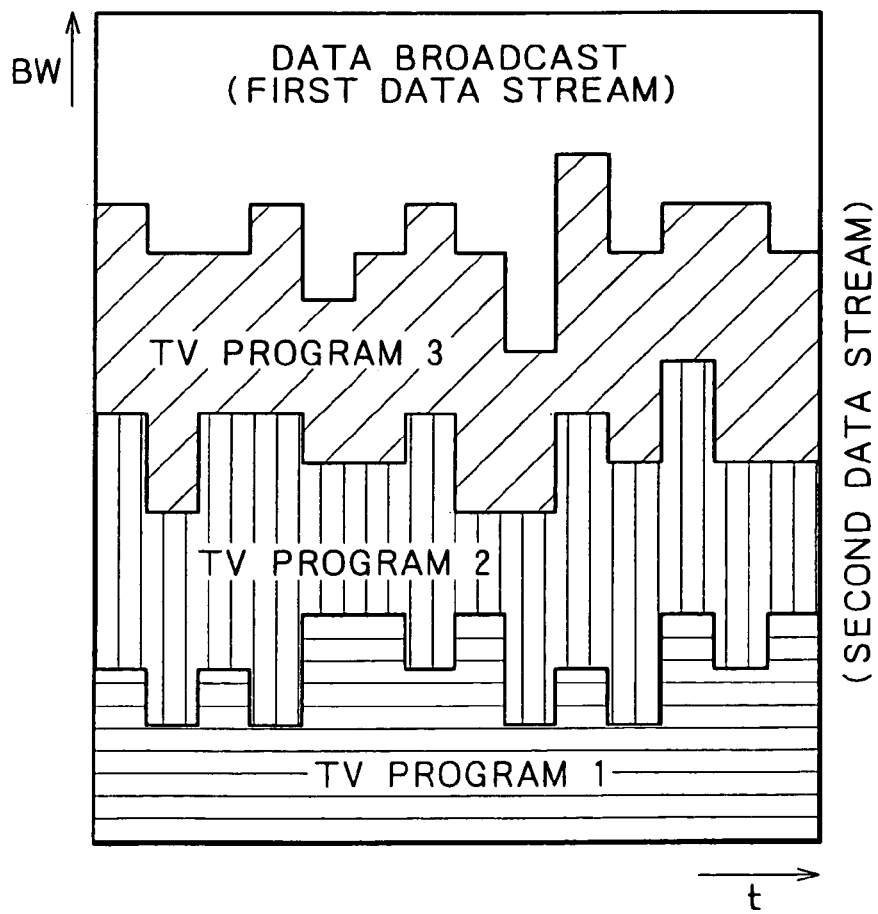
FIG. 12 is a conceptual view showing how transmission rates are allocated in a typical BS digital broadcasting setup of FIG. 10.

If the broadcast operator transmits three TV programs 1, 2 and 3 in multiplexed fashion as shown in FIG. 12, the available transmission rate used for data broadcasts in the first data stream is about 2 Mbps. By making the most of that transmission rate of about 2 Mbps, the broadcast operator multiplexes the data broadcasts (forming the first data stream) into the television broadcasts (constituting the second data stream) for transmission.

Figure 13:
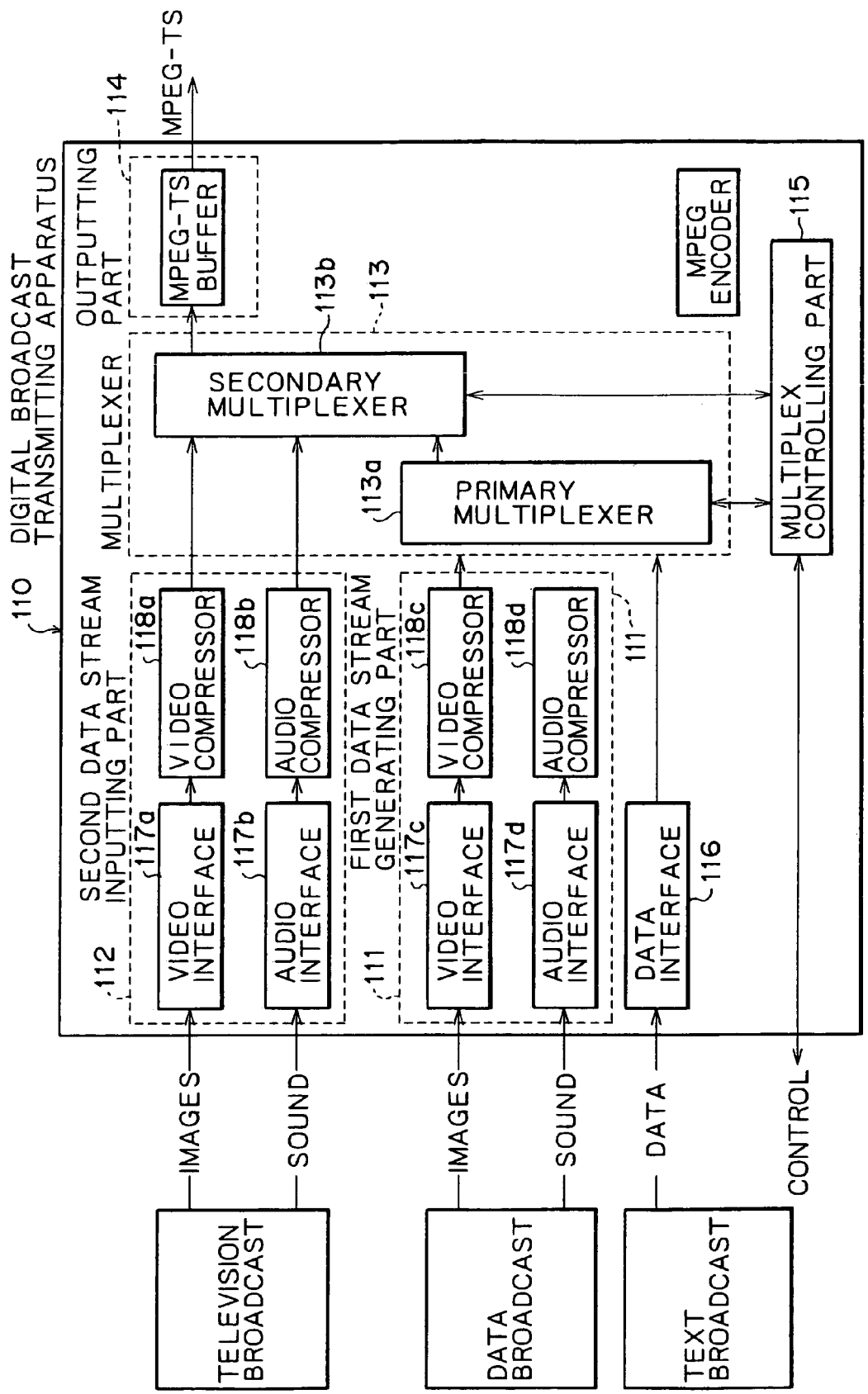
FIG. 13 is a block diagram illustrating how an MPEG decoder is typically structured in the digital broadcast transmitting apparatus of FIG. 10.

Described below with reference to FIG. 13 is a typical structure of an MPEG encoder used by the transmitting apparatus 110 for multiplexing compressed data broadcasts into television broadcasts in keeping with the transmission rate of the data broadcasts.

The MPEG encoder comprises: a second data stream inputting part 112 for inputting video (image) and audio (sound) data transmitted as BS digital broadcast programs; a first data stream generating part 111 for inputting video (image) and audio (sound) data of data broadcasts; a multiplexer 113 for multiplexing the first and the second data stream; a multiplex controlling part 115 that controls multiplexing; an outputting part 114 for outputting the multiplexed data stream; and a data interface 116 compatible with text broadcasting.

The second data stream inputting part 112 includes a video interface 117a and an audio interface 117b for inputting video and audio data. The inputting part 112 further comprises a video compressor 118a and an audio compressor 118b for compressing the data received through the interfaces 117a and 117b.

The first data stream generating part 111 includes a video interface 117c and an audio interface 117d for inputting video and audio data. The generating part 111 further comprises a video compressor 118c and an audio compressor 118d for compressing the data received through the interfaces 117c and 117d respectively.

The multiplexer 113 comprises a primary multiplexer 113a and a secondary multiplexer 113b. The primary multiplexer 113a multiplexes compressed data broadcasts that constitute the first data stream. In this example, the first data stream is multiplexed at a coding rate of 4 Mbps.

The secondary multiplexer 113b, on the other hand, causes the first data stream (of data broadcasts) with the coding rate of 4 Mbps to be assigned a transmission rate of 2 Mbps when multiplexed into the second data stream (of television broadcasts).

These multiplexers are controlled by the multiplex controlling part 115 in such a manner that the first data stream having the coding rate of 4 Mbps is multiplexed at the transmission rate of 2 Mbps. In other words, although the first data stream initially has the coding rate of 4 Mbps, it is assigned the transmission rate of 2 Mbps when multiplexed so that it travels twice as slow by time-based calculation. A narrow-band at the reduced transmission rate thus provided is used to multiplex the first data stream (of data broadcasts) for transmission.

Figure 14:
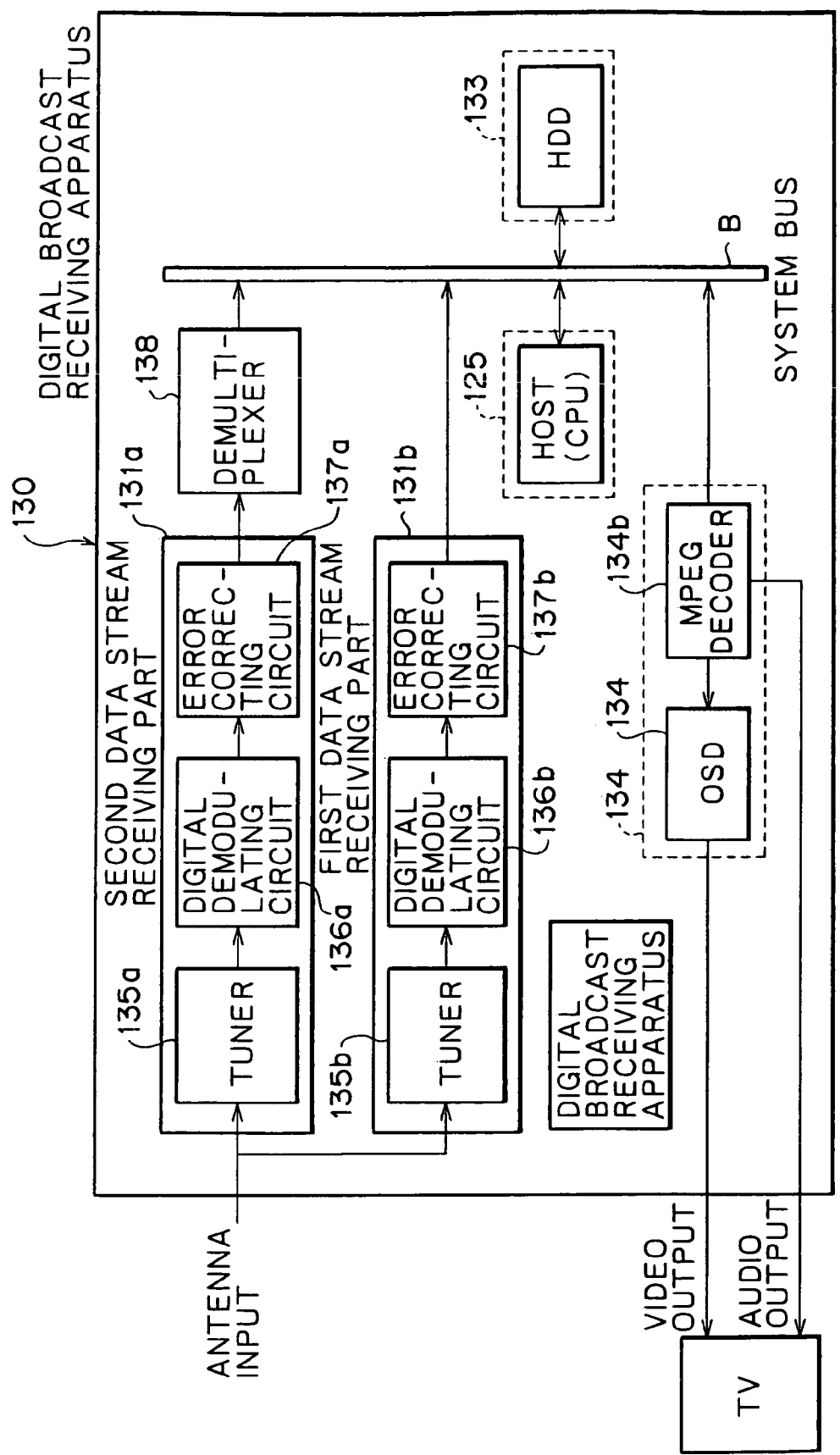
FIG. 14 is a block diagram depicting how a recording and reproducing section is typically structured in the digital broadcast receiving apparatus of FIG. 10.

Described below with reference to FIG. 14 is a typical structure of a receiving apparatus for receiving the first and the second data stream encoded and multiplexed by the MPEG encoder as explained above.

The receiving apparatus constituted as a hard disk recorder is connected to: a second data stream receiving part 131a for receiving the second data stream (of television broadcasts) derived from an antenna; a first data stream receiving part 131b for receiving the first data stream (of data broadcasts); a first data stream reproduction controlling part 125 over a system bus B; a first data stream recording part 133; and a first data stream reproducing part 134.

The second data stream receiving part 131a includes: a tuner 135a for receiving the second data stream (of television broadcasts); a digital demodulating circuit 136a for demodulating signals received by the tuner 135a; and an error correcting circuit 137a for correcting errors. The video and audio data in the demodulated data broadcasts are demultiplexed by a demultiplexer 138 before being fed onto the system bus B and output to a TV set as needed.

The first data stream receiving part 131b includes: a tuner 135b for receiving the first data stream (of data broadcasts) with the transmission rate of about 2 Mbps; a digital demodulating circuit 136b for demodulating signals received by the tuner 135b; and an error correcting circuit 137b for correcting errors. The first data stream (of data broadcasts) thus demodulated is recorded to the first data stream recording part 133.

The first data stream recording part 133 has a hard disk drive (HDD) with a storage capacity of about 38 GB and is capable of recording at least the first data stream (of data broadcasts). Obviously the hard disk storage capacity may be varied as needed. If the storage capacity is 38 GB and if the transmission rate is 4 Mbps, recordings of up to about 20 hours are made available. The hard disk drive may be attached externally to the TV set or may be incorporated therein.

The first data stream recording part 133 permits preferential recording of the first data stream of a genre with high audience ratings or the first data stream of a predetermined genre.

Illustratively, audience history data from users may be statistically processed to determine periodically which genre of programs is more frequently watched than others. In keeping with the results of the processing, the first data stream of the genre in question may be recorded preferentially. Alternatively, users are allowed to set a mode that selects a preferred genre. Given the results of such selection, the first data stream of the preferred genre may be recorded preferentially.

The genres may comprise program-related categories such as "movies," "music," "sports," "news" and "documentaries" as classified by program content type; and categories associated with attributes of products handled in e-commerce, such as "clothes," "food" and "events."

The first data stream reproduction controlling part 125 is constituted by a central processing unit (CPU) and allows the first data stream reproducing part 134 to reproduce the first data stream (of data broadcasts) after the stream has been recorded in its entirety.

The first data stream reproducing part 134, made up of an MPEG decoder 134b and an OSD (On-screen Display) 134a, outputs video and audio data of the first data stream (of data broadcasts) to the TV set.

As described, the first data stream (of data broadcasts) transmitted over a very narrow bandwidth from the transmitting apparatus is recorded onto the hard disk drive serving as a storage medium. The data stream is allowed to be reproduced after it has been recorded in its entirety. This makes it possible to reproduce the data stream at a very high rate although it has been transmitted at a relatively low speed.

Figure 15:
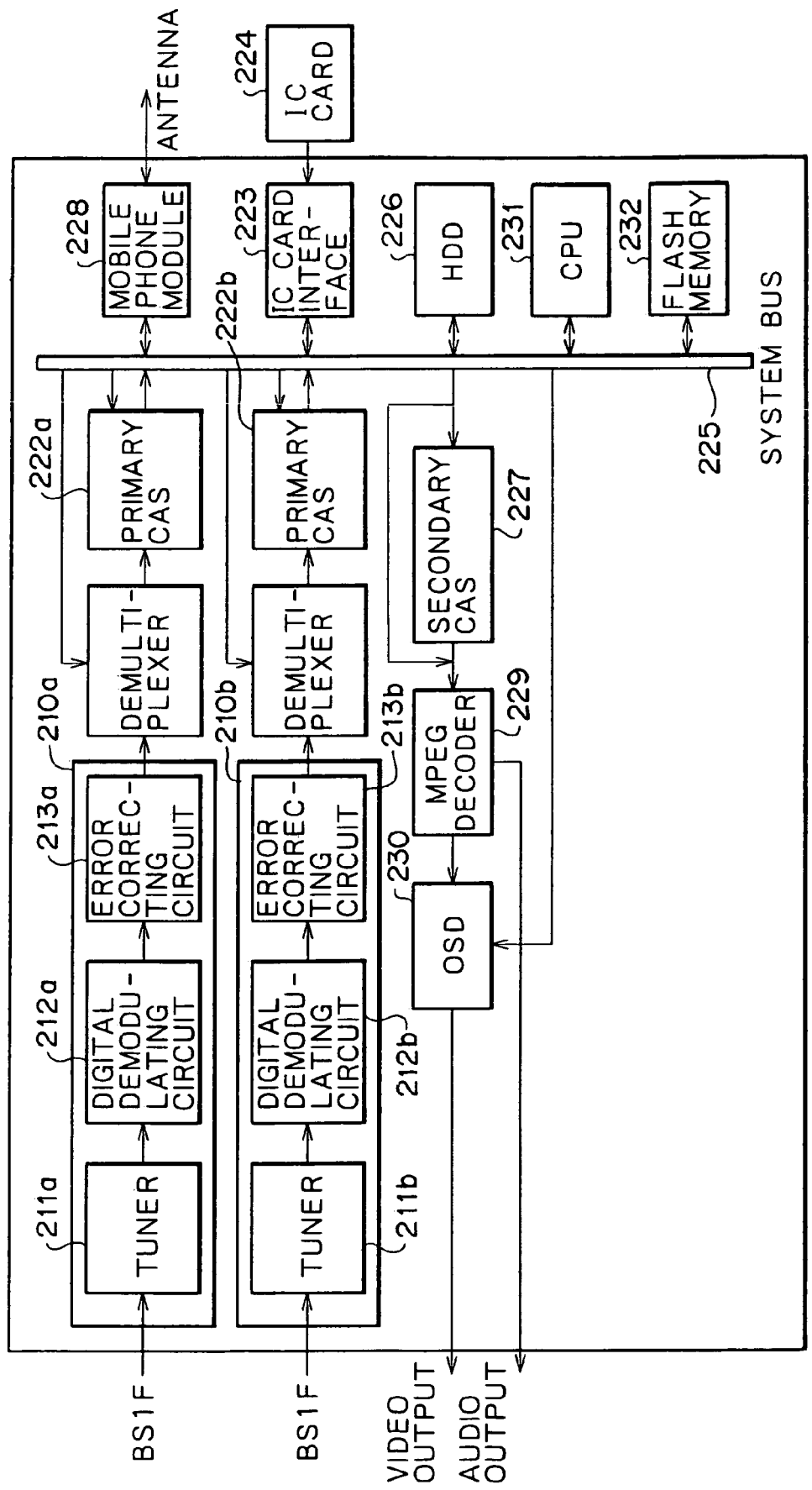
FIG. 15 is a block diagram indicating another typical structure of the recording and reproducing section in the digital broadcast receiving apparatus of FIG. 10.

Another typical receiving apparatus is described below with reference to FIG. 15. This receiving apparatus is structured as a hard disk recorder that has a primary and a secondary charging (CAS) function. In the description that follows, the user's operating procedure will be explained in addition to the structure and the workings of the hard disk recorder.

The hard disk recorder receives digital broadcast signals through an externally installed satellite antenna. A converter in the satellite antenna converts the received signals into intermediate frequency signals that are input to digital tuners 211a and 211b in data stream receiving parts 210a and 210b at the front end.

The digital tuners 211a and 211b convert the input intermediate frequency signals into base band signals for output to digital demodulating circuits 212a and 212b. The digital demodulating circuits 212a and 212b demodulate the input signals and output the demodulated signals to error correcting circuits 213a and 213b.

The error correcting circuits 213a and 213b correct errors that may exist in the demodulated data from the digital demodulating circuits 212a and 212b. From the error correcting circuits 213a and 213b, the data are output to demultiplexers 221a and 221b.

The demultiplexers 221a and 221b select one of the streams on a single input transmission channel as designated by the user. The selected stream is output to primary CAS parts 222a and 222b.

The primary CAS parts 222a and 222b descramble the stream supplied from the demultiplexers 221a and 221b on the basis of a key held in an IC card 224 attached to an IC card interface 223. If recording is designated by the key, the stream is sent and recorded to a hard disk drive 226 via a system bus 225.

If real-time viewing is designated by the key, the output of the primary CAS parts 222a and 222b is fed to a secondary CAS part 227.

Using a previously stored key (public key) or a key (also a public key) gained by accessing to a predetermined server through a mobile phone module 228, the secondary CAS part 227 descrambles the input stream that may turn out to be scrambled. The descrambled stream is output to an MPEG decoder 229.

The MPEG decoder 229 decodes the input stream as per MPEG criteria, supplying video signals to an OSD (On-screen Display) circuit 230. After multiplexing images and text based on suitable OSD data, the MPEG decoder 229 outputs the multiplexed data to a display device for display. Audio signals output by the MPEG decoder 229 are output to speakers or the like.

If a plurality of digital tuners are installed, the processing above may be carried on different channels simultaneously, or different streams may be recorded concurrently.

A CPU 231 controls the above-described operations in accordance with the user's orders. A flash memory 232 stores various data and programs as needed.

If the user orders viewing or recording through an EPG (Electronic Program Guide), a check is made for a match between a broadcasting station identifier or a program identifier included in the EPG data for program identification information on the one hand; and a network ID descriptor, partial transport stream time descriptor, or broadcast ID descriptor in an SIT (Selection Information Table) transmitted along with the stream on the other hand. A PID (Packet Identifier) of the necessary stream is fed to the multiplexer circuits for filtering purposes.

A check is made to see if the received stream is chargeable based on an ECM (Entitlement Control Message) and an EMM (Entitlement Management Message) transmitted together with the video and audio stream.

If the primary CAS alone is chargeable, then the data requiring the ECM and EMM are output to the IC card via the IC card interface circuit. Key information based on what has been processed in the IC card is acquired and descrambled by the primary CAS circuit.

When placing an order for a product or a service on the TV screen, the user selects the desired product or service on display. This causes the CPU to read from a flash memory or the like a destination telephone number to be connected through the server. The CPU then orders the mobile phone module to make a connection.

Given the connection order, the mobile phone module calls the destination telephone number and waits for a response from a destination server. When the connection is established, information about the selected product or service is obtained from the server and displayed as needed on the display device. When the user performs operations to purchase the selected product or service, the CPU transmits a purchase order to the server.

Given a request from the server for user authentication, the CPU transmits suitable data such as an apparatus ID number or user ID number. Upon receipt of information indicating the completion of purchase formalities and related topics from the server, the information is displayed as needed on the display device. When the user performs an operation to end the processing, the mobile phone module is disconnected. The CPU stores a purchase history and other relevant information into the flash memory or the like for subsequent retrieval and display upon request by the user.

Figure 16:
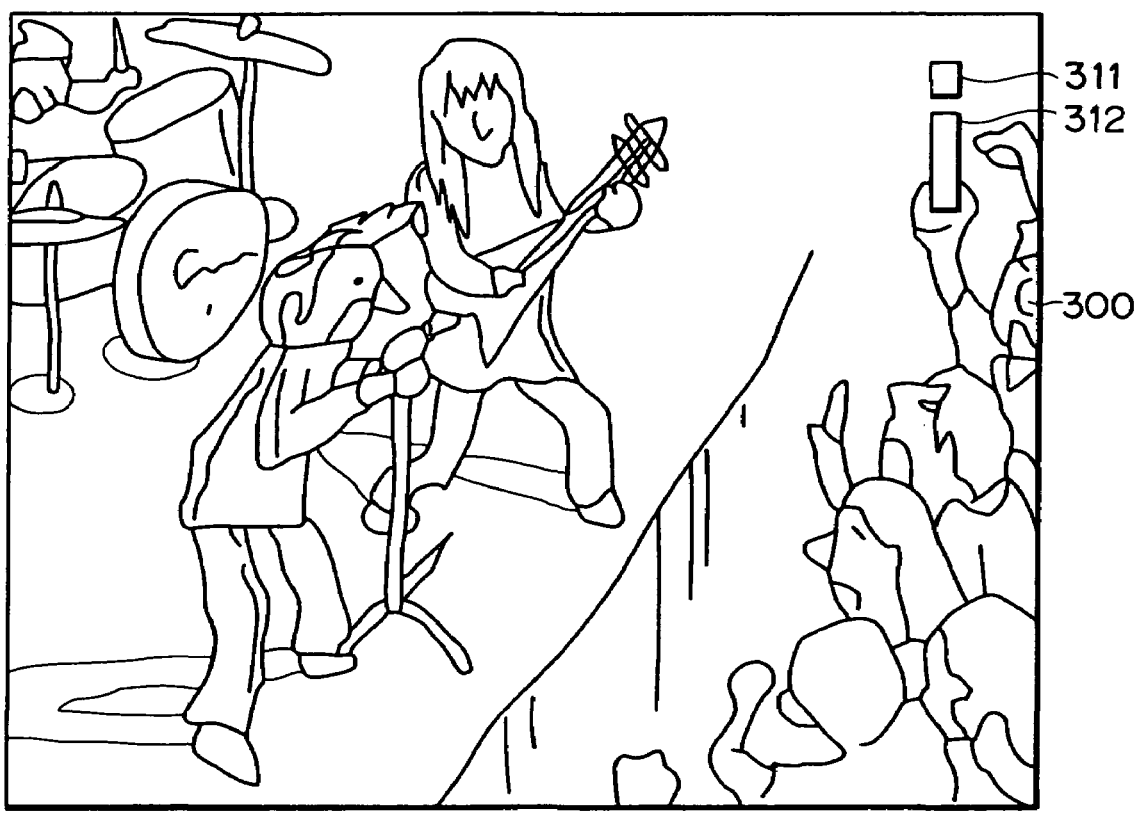
FIG. 16 is a block diagram of a typical animation display screen appearing at the digital broadcast receiving apparatus of FIG. 10.
Figure 17:
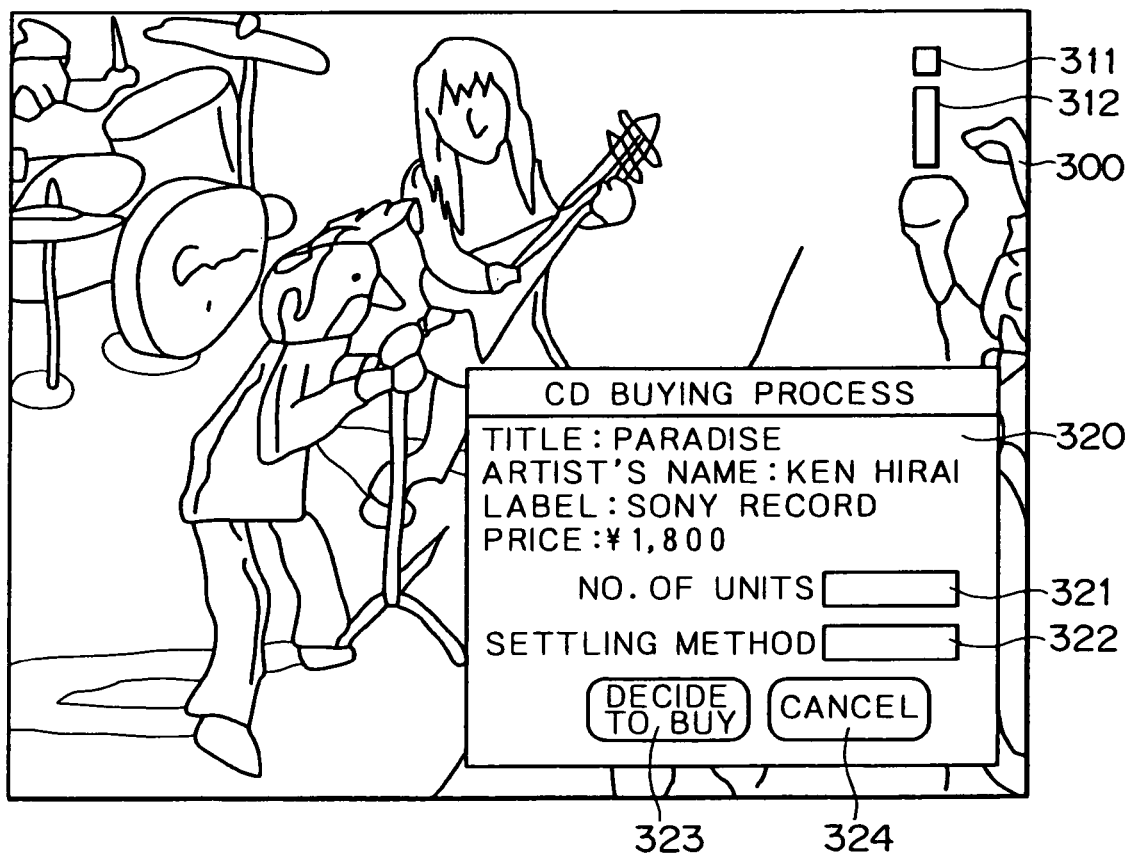
FIG. 17 is a block diagram of a typical product order screen appearing at the digital broadcast receiving apparatus of FIG. 10.
Figure 18:
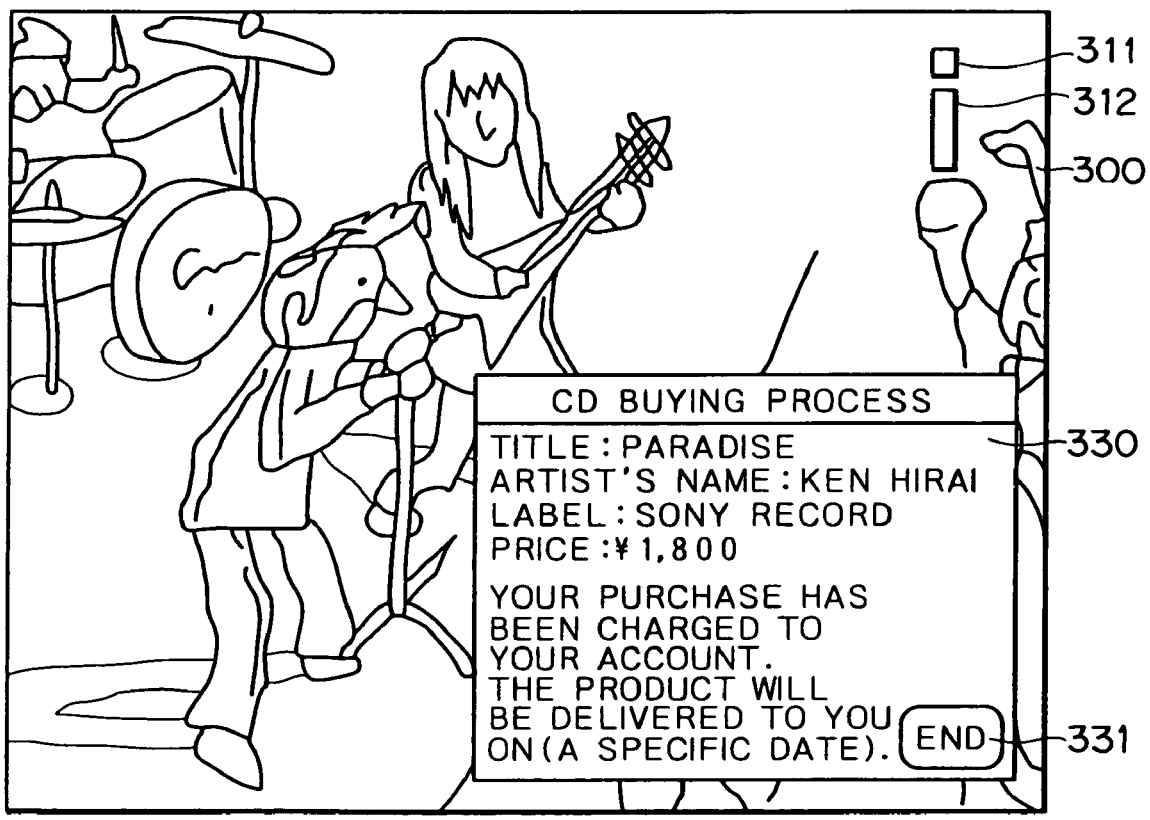
FIG. 18 is a block diagram of a typical product purchase verification screen appearing at the digital broadcast receiving apparatus of FIG. 10.

Described below with reference to FIGS. 16, 17 and 18 are operations to reproduce the first data stream stored by the hard disk recorder explained above. FIGS. 16, 17 and 18 show schematic display screens.

When contents of the hard disk are reproduced in a way allowing products or services to be purchased if desired, icons 311 and 312 are presented on a display screen 300 which is displaying an animation, as shown in FIG. 16, to prompt the viewer to make purchases.

If the viewer operates on a key (e.g., clicks on an icon) with the intention of making a purchase, a window 320 appears giving detailed information about products or services as shown in FIG. 17 (the screen of FIG. 17 indicates CD offerings).

In the window 320, the user makes necessary entries into input fields 321 and 322 regarding the number of units to buy, a settling method and other relevant items, and selects a "Decide to Buy" key 323 when making the purchase. Otherwise the user selects a "Cancel" key 324 to cancel the purchase procedure.

When the "Decide to Buy" key 323 is selected, a process of settling charges with a bank or a credit card company is carried out in accordance with the designated settling method.

After the settling process, an order for the product or service is placed, and a check is made to see if what is purchased is in stock. Information about a date of delivery is acquired from the retailer or distributor handling the purchase and is displayed in a window 330 on the screen 300, as shown in FIG. 18. Thereafter, the purchase operation is terminated by the user selecting an "End" key 331.

These keys may be designed so as to appear in four colors (blue, red, yellow, green) indicative of data broadcasts.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow.

For example, although the first and the second data stream have been shown multiplexed when transmitted, this is not limitative of the invention. Similar effects are obtained with a system wherein comparable data streams are assigned to a program broadcast band and a data broadcast band when transmitted, provided the transmitting side keeps a total of the program and data broadcast bands from exceeding a predetermined bandwidth and provided the receiving side records the data stream on the data broadcast band to a hard disk drive.

Furthermore, the storage medium is not limited to the hard disk. Other suitable media may be utilized for the same purpose.

While a preferred embodiment of the present invention has been described using specific terms, such description is for illustrative purposes only, and it is to be understood that changes and variations may be made without departing from the spirit or scope of the following claims.

What is claimed is:

1. A business management method comprising the steps of:
   obtaining information about earnings and expenses based on expenses incurred by content providers supplying users with recording devices compatible with contents offered by the providers, on content subscription fees paid by said users for receiving said contents, and on earnings derived from services and/or advertisements included in said contents;
   determining said services and/or advertisements to be provided to said users based on said users viewing history data;
   controlling fees to be paid for said services and/or said advertisements in accordance with said information about said earnings and expenses thus obtained;
   judging whether a share of the earnings can be paid back;
   initiating a process to decide on items applicable to pay back when that pay back is judged possible;
   managing the number of recording devices compatible with said contents provided by said content providers to said users; and
   determining fees to be paid for said services and/or advertisements included in said contents in accordance with the managed number of recording devices.

2. A business management method according to claim 1, wherein said services constitute electronic commerce practiced by virtual shops.

3. A business management method according to claim 1, wherein the share of said earnings is passed on to manufacturers of said recording devices in accordance with said information about said earnings and expenses.

4. A business management method according to claim 3, wherein said recording devices are leased free of charge to said users.

5. A business management method according to claim 1, wherein said content subscription fees paid by said users are controlled based on said information about said earnings and expenses.

6. A business management method according to claim 1, wherein said recording devices each include a hard disc drive.

7. A business management apparatus comprising:
   an information processing element for obtaining information about earnings and expenses obtained based on said expenses incurred by content providers supplying users with recording devices compatible with contents offered by said providers, on content subscription fees paid by said users for receiving said contents, and on said earnings derived from services and/or advertisements included in said contents;
   a first determining element for determining said services and/or advertisements to be provided to said users based on said users viewing history data;
   a controlling element for controlling fees to be paid for said services and/or said advertisements in accordance with said information about said earnings and expenses thus obtained;
   a judging element for judging whether a share of the earnings van be paid back;
   an initiating element for initiating a process to decide on items applicable to pay back when that pay back is judged possible;
   a managing element for managing the number of recording devices compatible with said contents provided by said content providers to said users; and
   a second determining element for determining fees to be paid for said services and/or said advertisements included in said contents in accordance with the managed number of recording devices.

8. A business management apparatus according to claim 7, wherein said services constitute electronic commerce practiced by virtual shops.

9. A business management apparatus according to claim 7, wherein said controlling element further allows the share of said earnings to be passed on to manufacturers of said recording devices in accordance with said information about said earnings and expenses.

10. A business management apparatus according to claim 7, wherein said controlling element further controls said content subscription fees paid by said users based on said information about said earnings and expenses.

11. A data broadcast delivery method comprising the steps of:
    allocating a data broadcast to any unused bandwidth over a broadcast band used by a broadcasting station to broadcast programs;
    receiving said data broadcast at a receiving side for storage onto a storage medium in each of a plurality of television sets;
    sorting out contents, including services and/or advertisements, in the stored data broadcast;
    determining said services and/or advertisements to be provided to users based on said users viewing history data;
    operating said plurality of television sets for selective viewing of the sorted-out contents;
    judging whether a share of the earnings can be paid back;
    initiating a process to decide on items applicable to pay back when that pay back is judged possible;
    storing said data broadcast successively onto said storage medium in such a manner that when a storage capacity of said storage medium either drops below a predetermined level or is completely exhausted, the initially recorded broadcast data are deleted from said storage medium to make room for the most recently received broadcast data.

12. A data broadcast delivery method according to claim 11, further comprising the step of;
    if a content selected by said receiving side is related to electronic commerce practiced by a virtual shop, then permitting access to said virtual shop associated with the selected content.

13. A data broadcast delivery method according to claim 11, wherein the data broadcast that may be stored onto said storage medium is delivered only to viewers having subscribed to membership in advance.

14. A data broadcast delivery method according to claim 13, wherein the subscription to said membership is chargeable.

15. A data broadcast delivery method according to claim 11, wherein said data broadcast includes audio data and video data.

16. A business management method comprising the steps of:
    obtaining information about earnings and expenses based on costs incurred by equipment manufacturers supplying users either free of charge or for a fee below cost with recording devices compatible with contents offered by content providers to said users, on content subscription fees paid by said users for receiving said contents, and on earnings derived from services and/or advertisements included in said contents;

determining said services and/or advertisements to be provided to said users based on said users viewing history data;

controlling amounts of money to be paid back to said equipment manufacturers in accordance with said information about said earnings and expenses;

judging whether a share of the earnings can be paid back;

initiating a process to decide on items applicable to pay back when that pay back is judged possible;

managing the number of recording devices compatible with said contents provided by said content providers to said users; and determining fees to be paid for said services and/or said advertisements included in said contents in accordance with the managed number of recording devices.

17. A business management method according to claim 16, wherein said business management method further comprises the step of controlling fees to be paid for said services and/or said advertisements in accordance with said information about said earnings and expenses.

18. A business management apparatus comprising:

an information processing element for obtaining information about earnings and expenses based on costs incurred by equipment manufacturers supplying users either free of charge or for a fee below cost with recording devices compatible with contents offered by content providers to said users, on content subscription fees paid by said users for receiving said contents, and on earnings derived from services and/or advertisements included in said contents;

a determining element for determining said services and/or advertisements to be provided to said users based on said users viewing history data;

a controlling element for controlling amounts of money to be paid back to said equipment manufacturers in accordance with said information about said earnings and expenses;

a judging element for judging whether a share of the earnings can be paid back;

an initiating element for initiating a process to decide on items applicable to pay back when that pay back is judged possible;

a managing element for managing the number of recording devices compatible with said contents provided by said content providers to said users; and a second determining element for determining fees to be paid for said services and/or said advertisements included in said contents in accordance with the managed number of recording devices.

19. A business management apparatus according to claim 18, wherein said controlling element further controls fees to be paid for said services and/or said advertisements in accordance with said information about said earnings and expenses.

\* \* \* \* \*